US010860387B2

(12) United States Patent
Ivancich et al.

(10) Patent No.: US 10,860,387 B2
(45) Date of Patent: Dec. 8, 2020

(54) DYNAMIC DISTRIBUTED WORK ALLOCATION

(71) Applicant: Red Hat, Inc., Raleigh, NC (US)

(72) Inventors: John Eric Ivancich, Ann Arbor, MI (US); Casey Taylor Bodley, Ann Arbor, MI (US); Matthew William Benjamin, Ann Arbor, MI (US); Daniel Francis Gryniewicz, Ann Arbor, MI (US)

(73) Assignee: Red Hat, Inc., Raleigh, NC (US)

( * ) Notice: Subject to any disclaimer, the term of this patent is extended or adjusted under 35 U.S.C. 154(b) by 71 days.

(21) Appl. No.: 16/354,941

(22) Filed: Mar. 15, 2019

(65) Prior Publication Data
US 2020/0293382 A1  Sep. 17, 2020

(51) Int. Cl.
G06F 16/907 (2019.01)
G06F 9/48 (2006.01)
G06F 9/52 (2006.01)

(52) U.S. Cl.
CPC ............. *G06F 9/52* (2013.01); *G06F 9/4881* (2013.01); *G06F 16/907* (2019.01); G06F 2209/5011 (2013.01)

(58) Field of Classification Search
None
See application file for complete search history.

(56) References Cited

U.S. PATENT DOCUMENTS

| 8,612,982 | B2* | 12/2013 | Choi | G06F 9/4881 |
| | | | | 718/102 |
| 8,726,053 | B2 | 5/2014 | Dutton et al. | |
| 9,742,692 | B2 | 8/2017 | Murthy et al. | |
| 10,592,281 | B1* | 3/2020 | Saidi | G06F 9/4881 |
| 2007/0124545 | A1* | 5/2007 | Blanchard | G06F 9/30087 |
| | | | | 711/152 |
| 2008/0168446 | A1* | 7/2008 | Shen | H04L 67/322 |
| | | | | 718/101 |
| 2009/0271793 | A1* | 10/2009 | Rostedt | G06F 9/526 |
| | | | | 718/103 |

(Continued)

OTHER PUBLICATIONS

Cooper, Brian F. et al., "Bidding for storage space in a peer-to-peer data preservation system." Proceedings 22nd International Conference on Distributed Computing Systems. IEEE, 2002. 16 pages.

(Continued)

Primary Examiner — Isaac T Tecklu
(74) Attorney, Agent, or Firm — K&L Gates LLP

(57) ABSTRACT

Dynamic distributed work allocation is disclosed. For example, a first work server (WS) stores a first plurality of tasks and a second WS stores a second plurality of tasks. A work client (WC) is configured to send a first lock request (LR) with a first priority value (PV) to the first WS and a second LR with a second PV to the second WS. The WC receives a first lock notice (LN) and a first task from the first WS, and a second LN and a second task from the second WS. Prior to a first lock duration (LD) expiring and completing processing of the first task, the WC sends a third LR to the first WS that extends the first LD. After completing the second task, the WC sends a lock release notice and a fourth LR to the second WS.

13 Claims, 14 Drawing Sheets

(56) References Cited

U.S. PATENT DOCUMENTS

| | | | | |
|---|---|---|---|---|
| 2014/0189693 A1* | 7/2014 | Trumbull | ............... | G06F 9/466 |
| | | | | 718/101 |
| 2014/0359632 A1* | 12/2014 | Kishan | ................. | G06F 9/4881 |
| | | | | 718/103 |
| 2015/0089509 A1* | 3/2015 | Brown | ............... | G06F 11/3419 |
| | | | | 718/103 |
| 2015/0278243 A1 | 10/2015 | Vincent et al. | | |
| 2016/0352663 A1* | 12/2016 | Hopkins | ................ | H04L 51/26 |
| 2017/0039234 A1* | 2/2017 | Wagle | ................ | G06F 16/2322 |
| 2017/0060932 A1* | 3/2017 | Wu | ..................... | G06F 16/2343 |
| 2018/0136979 A1* | 5/2018 | Morris | ................. | G06F 9/5027 |
| 2019/0050255 A1* | 2/2019 | Chagam Reddy | .... | G06F 9/4881 |

OTHER PUBLICATIONS

Zhang, Hong, et al., "Data replication placement strategy based on bidding mode for cloud storage cluster." 2014 11th Web Information System and Application Conference. IEEE, 2014. 6 pages.

* cited by examiner

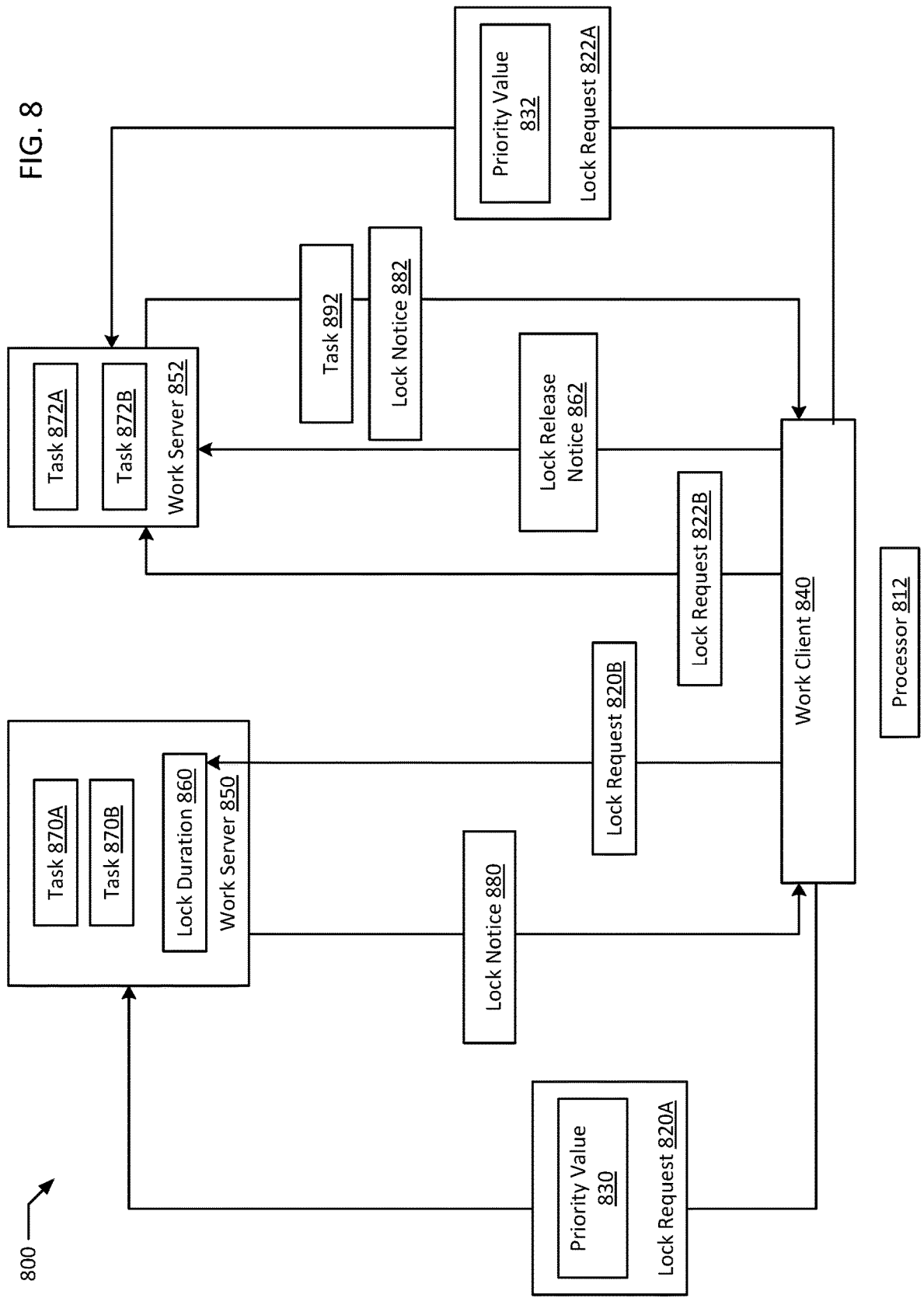

DYNAMIC DISTRIBUTED WORK ALLOCATION

BACKGROUND

The present disclosure generally relates to parallel processing tasks in distributed computer systems. In computer systems, data is typically processed to yield results. Processing large amounts of data may require proportionately large amounts of data storage and processing power. Certain processing tasks may be handled in parallel, where multiple processors are employed simultaneously to handle different aspects or subtasks of a larger processing task, for example, where numerous different sets of data need to be processed before becoming an input for a further processing step, the different sets of data may be divided up to be processed on different processors. As data sets increase in size, the physical hardware hosting the applications handling the processing tasks may become a bottleneck limiting throughput. To scale parallel processing capabilities beyond the physical limitations of a given physical host, processing tasks may be distributed to other hosts via network connections, resulting in distributed computer systems.

SUMMARY

The present disclosure provides a new and innovative system, methods and apparatus for dynamic distributed work allocation. In an example, a plurality of work servers each store a respective plurality of tasks including a first work server storing a first plurality of tasks and a second work server storing a second plurality of tasks. A work client is configured to send a first plurality of lock requests to the plurality of work server, including a first lock request with a first priority value to the first work server and a second lock request with a second priority value to the second work server. The work client receives a first lock notice and a first task from the first work server, and a second lock notice and a second task from the second work server. Prior to a first lock duration expiring and prior to completing processing of the first task, the work client sends a third lock request to the first work server, where the first lock duration is extended based on the third lock request. After processing of the second task is complete, the work client sends a first lock release notice to the second work server. After sending the first lock release notice, the work client sends a fourth lock request to the second work server.

Additional features and advantages of the disclosed method and apparatus are described in, and will be apparent from, the following Detailed Description and the Figures.

BRIEF DESCRIPTION OF THE FIGURES

FIG. 8 is a block diagram of a dynamic distributed work allocation system according to an example of the present disclosure.

DETAILED DESCRIPTION OF EXAMPLE EMBODIMENTS

Figure 1:
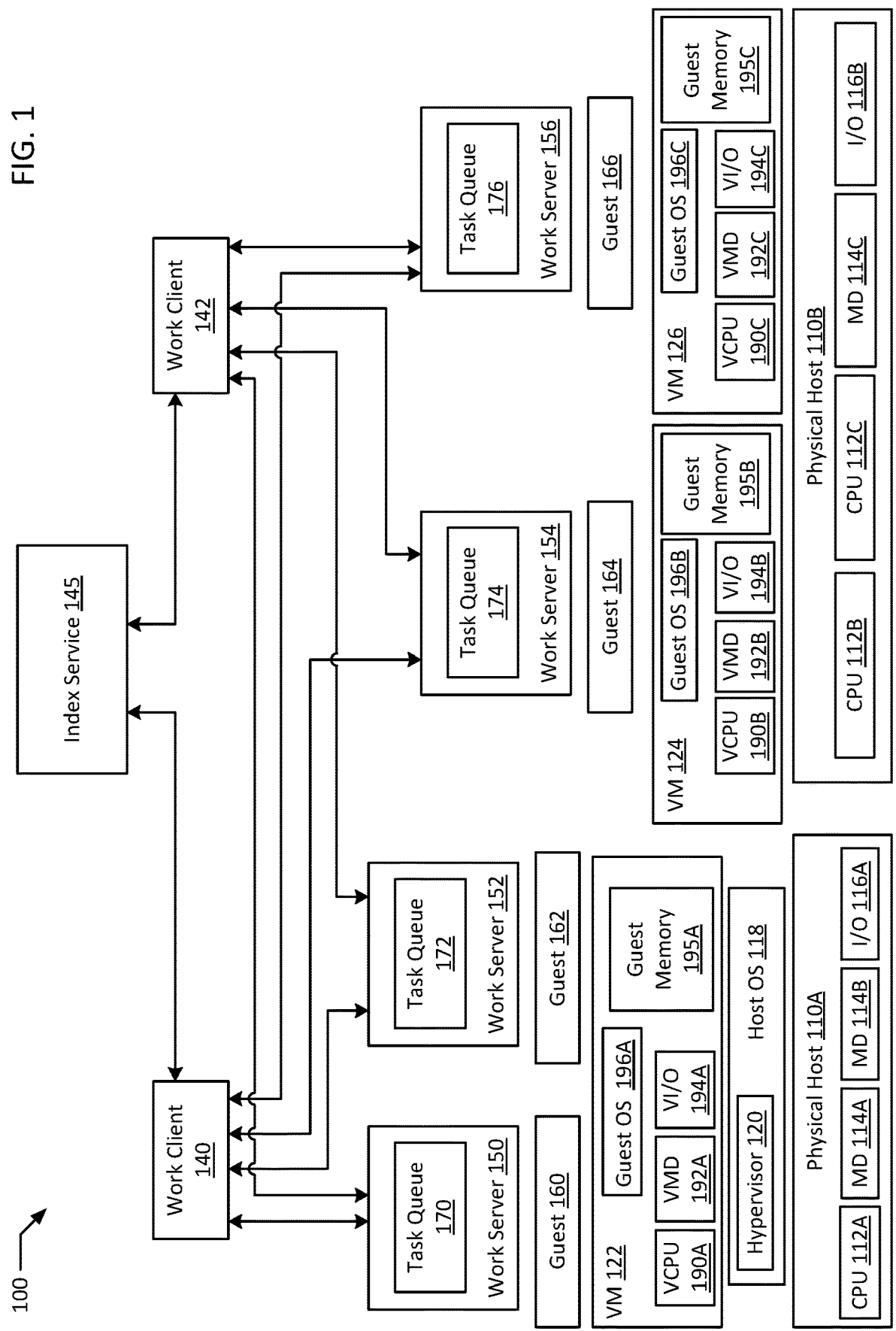
FIG. 1 is a block diagram of a dynamic distributed work allocation system according to an example of the present disclosure.

For scalability and efficiency reasons, many computer systems employ virtualized guests such as virtual machines and containers to execute computing tasks performed by the computing systems, such as hosting applications. Typically, guests such as containers and virtual machines may be launched to provide extra compute capacity, while isolating compute resources used by different users and tenants away from those of other users. Employing guests enables rapid scaling of applications to the volume of traffic requesting the services provided by those applications. In addition, guests typically allow for increased deployment flexibility since guests may typically be deployed in a variety of hardware environments. Multiple guests may also be clustered together to perform more complex functions than the respective guests are capable of performing individually. In an example, a virtual machine ("VM") may be a robust simulation of an actual physical computer system utilizing a hypervisor to allocate physical resources to the virtual machine. Software applications developed in a variety of programming languages are executed on physical hosts or virtual hosts (e.g., VMs and containers). Data stored in computer systems (e.g., by applications executing on these computer systems) typically requires some form of structure for efficient storage and retrieval. Typically, an index may be implemented to include key features of the data stored (e.g., a name, size, and memory location). Data may be organized in various units of storage, for example, as files or objects, which may in turn be organized in containers (e.g., directories, databases, buckets, etc.) to provide additional structure for ease of retrieval. As data storage grows in size for a given computer system, the data may be required to be spread out over multiple distributed physical and/or virtual hosts. Indexing the data gets ever more complex as the number of storage nodes in the computer system increases. Different distributed storage solutions (e.g., Red Hat® Ceph®, OpenStack® Swift, Amazon S3®, etc.) may adopt different terminology, however, a core concept of compartmentalizing storage into some form of subunit or bucket is generally implemented, at least on a per user and/or per account level to provide some logical structure to the storage. Individual named data objects may then be stored in these buckets.

Typically, guests in the form of virtual machines, containers, and other virtualized environments executing on physical hardware may be deployed as hosting platforms for executing applications, which in turn execute processing tasks. Many typical computing tasks require performing similar repeated processing tasks on different data inputs. For example, simulation techniques for making predictions based on statistical models (e.g., Monte Carlo simulations, K-means clustering simulations, etc.) used in fields ranging from scientific research to economic and financial modeling typically include performing many similar estimations to develop a simulation of likely outcomes for a given set of inputs and assumptions. Similarly, many big data processing tasks for deriving correlations and finding relationships between data in large data sets, whether in scientific research (e.g., bioinformatics, genetics, pharmaceutical chemistry, physics, etc.) or in finding consumer trends and optimizing internet search results will often require processing numerous data inputs in similar ways. These processing tasks may often be executed in parallel as each processing run is typically independent of each other run, with the results of the various runs only recombined to reach a final conclusion. Deploying guests to handle such parallel processing typically allows for flexible scaling of processing capacity for such processing tasks.

Parallel processing may greatly increase processing throughput in many typical execution scenarios. However, within each task processed in parallel, there are typically steps that must be performed in series in order for to generate the correct inputs for the next steps in a chain of processing tasks performed on a given set of data. To maintain data consistency, modifications to any given subset of data (e.g., a segment or shard of the total data set being processed) may be restricted by locking changes to that subset to a certain processing node. This prevents multiple processing nodes from processing the same subset of data creating data inconsistencies. A problem with locking inputs to certain processing nodes in distributed parallel processing is that tasks tend not to be distributed evenly. For example, where the number of input sources or data shards to process is not equal to the number of processing nodes, an earlier instantiated processing node may obtain locks on a disproportionate share of input sources, often more locks than the processing node can handle. This results in the processing node becoming a throughput bottleneck. Meanwhile, a later instantiated processing node may be unable to obtain sufficient input data to process due to the earlier instantiated processing node having already obtained locks on these data sources.

In systems where work servers act as queues or aggregators of processing tasks that are then distributed to work clients (e.g., processing nodes performing processing tasks on the processing tasks from the work servers), an artificial bottleneck tends to be introduced in terms of processing efficiency due to certain work clients tending to "hoard" work (e.g., processing tasks), especially where the work servers and work clients are deployed independently of each other. Individual work clients may be configured to handle processing tasks from multiple work servers in parallel, for example, where such work clients are configured to access multiple physical processor cores or threads. In many deployments, work clients may be deployed dynamically without being aware of the existence of other work clients. These work clients may each be configured to request work from many work servers to ensure that the work from each work server is being handled. However, work clients may often end up requesting more work than they can handle simultaneously, and may obtain locks on the workflows and tasks of many work servers. This creates scalability issues where deploying more work clients fails to proportionately increase processing throughput because the new work clients are unable to obtain sufficient work to process due to the previously deployed work clients already having locks on the various work servers. Redistributing workloads for efficiency may therefore entail manual overrides or other forms of manual intervention, and/or adding capabilities for work clients to detect and communicate with each other. These remediations add overhead in terms of processing and networking latency, and reduces the dynamic scalability of adding and removing work clients. Additional detection capabilities would also tend to be required to detect failed processing tasks.

The dynamic distributed work allocation system described herein allows work to be relatively evenly distributed among work clients, even newly instantiated work clients. In example systems, individual work servers and work clients need not be aware of each others' existence. As long as an index of active work servers is maintained, a work client may detect all of the currently active work servers by querying the index. The work client may then assign, by some form of arbitrary weighting system (e.g., pseudo-randomly) a preference or priority value for work from each work server. These priority values are then communicated to each work server. Each work server maintains a list of all priority values received from the various work clients. The workloads stored on each work server are divided into segments or tasks, and a task is sent to the work client with the highest priority current priority value for processing. Each work client periodically reassigns priority values and resends these priority values to the work servers. These priority value containing messages serve multiple purposes. First, they serve as a heartbeat that allows a work server to track all of the currently active work clients that are available to process work, as well as to verify that a work server's currently assigned work client is in good health (e.g., hasn't frozen or crashed). Second, the priority value messages, due to periodically changing priority values, add a randomization factor that prevents a work client from continuously holding on to work from a disproportionate share of work servers. For example, without re-randomization, a work client that assigns priority values of 0, 1, 2, 3 to four work servers will continuously hold on to ¾ of the workload as compared to a second work client that assigns priority values of 1, 2, 3, 0 to the same respective work servers. By quantizing workloads into individual, discrete processing tasks reevaluating which work client receives a subsequent processing task after a current task is completed, any updates to a given work server's priority list of work clients while a task is being processed will be reflected during such reevaluations, and therefore newly instantiated work clients will have a chance on securing the next task. Since each work client is configured to assign and reassign different priority values to each work server, over the course of time, work tends to become equitably distributed between work clients, and any inequitable distributions tend to be short-lived. In addition, priority values may be provided with a timeout value that serves as a heartbeat for any given work client. As long as a new priority value is received before the timeout is exceeded, priority value update messages may serve as a heartbeat indicating that the work client has not experienced any failure. If a work client fails to issue such a heartbeat message while also failing to issue a confirmation that it's previous task is complete, a work server may determine that the processing task has failed and reassign the processing task to another work client. Therefore, one regularly sent message containing a priority value and timeout value may serve multiple purposes (e.g., announcement that a new work client is active, bidding for tasks via priority value, heartbeat, processing time extension). In most cases (e.g., where a work client fails to be the highest priority for the next task), such messages may not even require a response, or may simply be acknowledged as received. This allows for work to be distributed with very little added processing and networking overhead and also without administrative intervention.

FIG. 1 is a block diagram of a dynamic distributed work allocation system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refer to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may execute one or more isolated guests, for example, VM 122, which may in turn host additional virtual environments (e.g., VMs and/or containers), for example, guests 160 and 162. In an example, a container (e.g., guest 160 or 162) may be a guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A. In an example, guest 160 and/or guest 162 may be VMs or containers executing on VM 122. In an example, guest 160 may execute work server 150 that hosts a task queue 170 of tasks to be assigned for processing. In an example, executing work server 150 may additionally include executing with one or more layers of additional virtualization. For example, work server 150 may execute inside of another guest. In an example, work server 150 may be programmed in an interpreted language executing in a specific runtime environment with some of the features of a full fledged virtual guest (e.g., Java Runtime Environment®). In an example, guest 162 also executing on VM 122 may host work server 152 (e.g., a second copy of work server 150 hosting task queue 172). In an example, work servers 150 and 152, and task queues 170 and 172 may host tasks to be processed as part of the same distributed processing task.

System 100 may run one or more guests (e.g., VM 122 guests 160, 162), by executing a software layer (e.g., hypervisor 120) above the hardware and below the VM 122, as schematically shown in FIG. 1. In an example, the hypervisor 120 may be a component of respective host operating system 118 executing on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization. In an example, VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, VMs 124 and 126 may be similar virtualization implementations to VM 122, but may, for example, execute separate operating systems (e.g., guest OS 196B-C). In an example, guest OSes 196BC may be incompatible with guest OS 196A and/or host OS 118. In an example, guests 124 and 126 execute on physical host 110B, with VCPU 190B-C, VIVID 192B-C, VI/O 194B-C, and guest memory 195B-C virtualizing access to physical CPU 112B-C, MD 114C, and I/O 116B. In an example, VMs 124 and 126 may host guests 164 and 166 respectively, with guest 164 hosting work server 154 hosting task queue 174, and guest 166 hosting work server 156 hosting task queue 176. In an example, work servers 154 and 156, and task queues 174 and 174 may be associated with the same distributed processing task as work servers 150 and 152. In another example, work server 154 and/or 156 may host processing tasks that are associated with a different distributed processing job from work servers 150 and 152 so long as work clients 140 and 142 are capable of processing both types of processing tasks.

In an example, a guest virtualization orchestrator (e.g., Red Hat® OpenShift®, Kubernetes®) managing virtual compute resources for system 100. In an example, a scheduler may be integrated with the guest virtualization orchestrator to instantiate guests (e.g., work clients 140 and 142) to execute processing tasks. In an example, work clients 140 and/or 142 may be implemented with any suitable form of executable code. In an example, an orchestrator may deploy work clients 140 and/or 142 to hosts physically proximate to work servers 150, 152, 154, and/or 156 to reduce networking latency between work server and work client. For example, work client 140 may be deployed on physical host 110A (or on a VM deployed on physical host 110A) and work client 142 may be deployed on physical host 110B (or on a VM deployed on physical host 110B). In another example, work client 140 and/or 142 may be deployed on any other physical host communicatively coupled with work servers 150, 152, 154, and 156. In an example, an index service 145 maintains a listing of connection information (e.g., universal resource locators) of work servers 150, 152, 154, and 156. In an example, work clients 140 and 142 retrieve connection information for work servers 150, 152, 154, and 156 from index service 145. In an example, index service 145 is implemented as a centralized index, for example, as a relational database associated with a database management system ("DBMS"). A DBMS is a software application that facilitates interaction between the database and other components of the system 200. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, index service 145 may be implemented as a distributed index, which may include an index of index segments that is consulted to determine the proper host(s) from which a given index entry may be retrieved. In an example, index service 145 may be deployed on one or more physical hosts (e.g., physical host 110A, 110B, or other similar host(s)). In another example, index service 145 may be implemented as a distributed index, with a centralized index of indexes that addresses specific information stored in distributed sub-indexes, for example, stored with various work servers.

In the example, storage for processing tasks and results may be provided in the form of a distributed storage solution (e.g., Red Hat® Ceph®, OpenStack® Swift, Amazon S3®, etc.) that may additionally employ a distributed file system (e.g., Red Hat® GlusterFS®) providing storage in the form of distributed storage volumes deployed across multiple storage hosts (e.g., VMs 122, 124, and 126). In an example, any form of suitable network may be employed for enabling communications between computing devices of system 100 (e.g., physical hosts 110A-B, VMs 122, 124, and 126, guests 160, 162, 164, and 166). For example, a public network (e.g., the Internet), a private network (e.g., a local area network (LAN) or wide area network (WAN)), or a combination thereof may be employed to connect the component parts of the system (e.g., physical hosts 110A and 110B and their respective guests) to each other. In an example, the various software components of system 100 (e.g., VMs 122, 124, and 126, guests 160, 162, 164, 166, task queues 170, 172, 174, 176, work clients 140 and 142, index service 145, etc.) may be implemented via any suitable form of computing module (e.g., application, executable, script, hardware module, etc.).

Task queues 170, 172, 174, and 176 may queue any form of distributed, parallel processing task. For example, a Monte Carlo simulation may require 10,000 simulation runs, and 2500 simulation runs are queued in each of task queues 170, 172, 174, and 176. In an example, task queues 170, 172, 174, and 176 may be configured to be filled with additional processing tasks as they arise (e.g., another simulation may add new simulation runs as tasks to each queue). In such an example, work clients 140 and 142 may be configured to execute queued simulations from task queues 170, 172, 174, and 176. In such an example, multiple simulation runs may be grouped together as a processing task segment.

In an illustrative example, work servers 150, 152, 154, and 156, along with work clients 140 and 142 may be deployed as components of a distributed storage system. For example, task queues 170, 172, 174, and 176 may each be associated with different shards or segments of a distributed storage system implemented with cross host replication (e.g., Red Hat Ceph®). In the example, when a change is made to a file stored in one storage node of the distributed storage system, the change needs to be replicated to other storage nodes mirroring the storage node. In addition to updating the contents of the file, additional filesystem updates (e.g., to metadata associated with the file and index entries for locating the file) may also be required. In an example, a change to a file in VIVID 192A is queued for replication in task queue 170, retrieved as a task by work client 140, and propagated to a corresponding mirrored volume on another host. As file and metadata changes keep occurring, they are added to task queue 170 and processed by work client 140. In such an example, multiple changes may occur on the same file so processing changes in the correct sequence may be vital to keeping replicated copies of the same file in sync. Therefore, work client 140 may be configured to obtain a lock on tasks from task queue 170 and continue processing tasks from task queue 170 for a set period of time, a set number of changes, or a set size of changes prior to releasing its lock.

In an example, each of work clients 140 and 142 may be implemented with access to numerous processor cores and/or threads. In an example, work client 140 executing at full efficiency may be capable of simultaneously handling workloads from all of work servers 150, 152, 154, and 156. However, work client 140, if deployed on a virtual host, may be required to share computing resources with other guests and may therefore become a bottleneck for processing the combined workloads of work servers 150, 152, 154, and 156, causing tasks to queue up in task queues 170, 172, 174, and 176. In an example, work client 142 may be deployed to alleviate work client 140 as a throughput bottleneck. For example, a deployment orchestrator may trigger an additional work client to be deployed based on queue depths of task queues 170, 172, 174, and/or 176.

FIGS. 2A-F are block diagrams of competitive task allocation between a plurality of work servers and a plurality of work clients according to an example of the present disclosure. In example system 200 illustrated in FIG. 2A, work clients 140 and 142 are actively executing to process tasks queued on work servers 150, 152, 154, and 156. In the example, work clients 140 and 142 retrieve connection information for work servers 150, 152, 154, and 156 from index service 145. In an example, work client 140 and work client 142 may be configured to independently generate priority values (e.g., priority values 220A, 222A, 224A, 226A, and priority values 230A, 232A, 234A, and 236A) associated with each of work servers 150, 152, 154, and 156. In an example, priority values 220A, 222A, 224A, and 226A are configured to be compatible with priority values 230A, 232A, 234A, and 236A. For example, both work clients 140 and 142 are configured to generate integers for priority values, with a lower integer indicating a higher priority. In an example, priority values generated by work client 140 and 142 may be on the same scale. For example, each of priority values 220A, 222A, 224A, 226A, 230A, 232A, 234A, and 236A may be one of the integers from 0 to 3. In such an example, each of work servers 150, 152, 154, and 156 may receive two priority values, one from work client 140 and one from work client 142. There would be a roughly equal chance that each work server receive a higher priority value from work client 140 or work client 142. In an example, priority value 220A is 0, priority value 222A is 1, priority value 224A is 2, and priority value 226A is 3, while priority value 230A is 1, priority value 232A is 2, priority value 234A is 3, and priority value 236A is 0. In such an example, work client 140 would send the lower integers indicating higher priority to work servers 150, 152, and 154, while work client 142 would have indicate higher priority to work server 156.

Priority scaling may be adjusted to factor for differences between work clients. For example, work client 140 may be configured with more processing power than work client 142, in which case the priority value scales for the different work clients may be adjusted to favor work client 140 over work client 142. In such an example, work client 140 may pseudorandomly, by round robin, or otherwise assign the integer values 0, 1, 2, and 3 to priority values 220A, 222A, 224A, and 226A, while work client 142 may assign the values 0, 2, 4, and 6 to priority values 230A, 232A, 234A, and 236A. In such an example, work client 142 would have no chance at having the highest priority for any work server it sends a priority value of 4 or 6 to, as these values would be higher than the highest integer value assignable by work client 140. Work client 142 could still likely have the highest priority for a work server sent a 0 priority value though, and may have the highest priority value for a work server sent a 2 priority value. This allows for work client 140 to naturally have a higher chance at securing more work, while still allowing work client 142 to receive some processing tasks. In systems with hundreds of work servers, the odds of work client 142 being totally excluded from obtaining work due to priority value scaling would be significantly lower than in the illustrated four work server system.

For simplicity of explanation, work clients 140 and 142 are assumed to generate priority values on the same scale (e.g., 0 to 3). In addition, it is assumed that work servers 150, 152, 154, and 156 receive priority values from both work clients 140 and 142 prior to responding to either work client with an assigned task. In an example, work servers 150, 152, 154, and 156 may be configured to pause and wait (e.g., 1-30 seconds) for additional priority values (e.g., priority values 230A, 232A, 234A, and 236A from work client 142) prior to assigning locks or tasks in order to avoid minor startup latency differences from allowing the first work client to come online (e.g., work client 140) from monopolizing all of the initial tasks from all of the work servers 150, 152, 154, and 156. In an example, each of the messages carrying priority values 220A, 222A, 224A, 226A, 230A, 232A, 234A, and 236A may be additionally configured with a timeout value indicating a valid duration for the respective priority value. The work servers 150, 152, 154, and 156 may therefore be configured to determine that a work client has crashed if a new priority value is not received from such work client prior to the expiration of the timeout duration. In an example, the messages carrying priority values may additionally include a request for a lock (e.g., a request to be the exclusive work client processing tasks for a given work server). In an example, a work server may also be configured to determine that each priority value message is an implied request for work and an implied request for a lock, which may reduce network traffic. Similarly, a default timeout duration may be configured for system 200 (e.g., 5 minutes) which may allow priority value messages to avoid sending an explicit timeout duration.

In an example, work server 150 receives priority value 220A (e.g., 0) and priority value 230A (e.g., 1), and determines that priority value 220A is higher priority than priority value 230A; work server 152 receives priority value 222A (e.g., 1) and priority value 232A (e.g., 2), and determines that priority value 222A is higher priority than priority value 232A; work server 154 receives priority value 224A (e.g., 2) and priority value 234A (e.g., 3), and determines that priority value 224A is higher priority than priority value 234A; and work server 156 receives priority value 226A (e.g., 3) and priority value 236A (e.g., 0), and determines that priority value 236A is higher priority than priority value 226A.

Figure 2A:
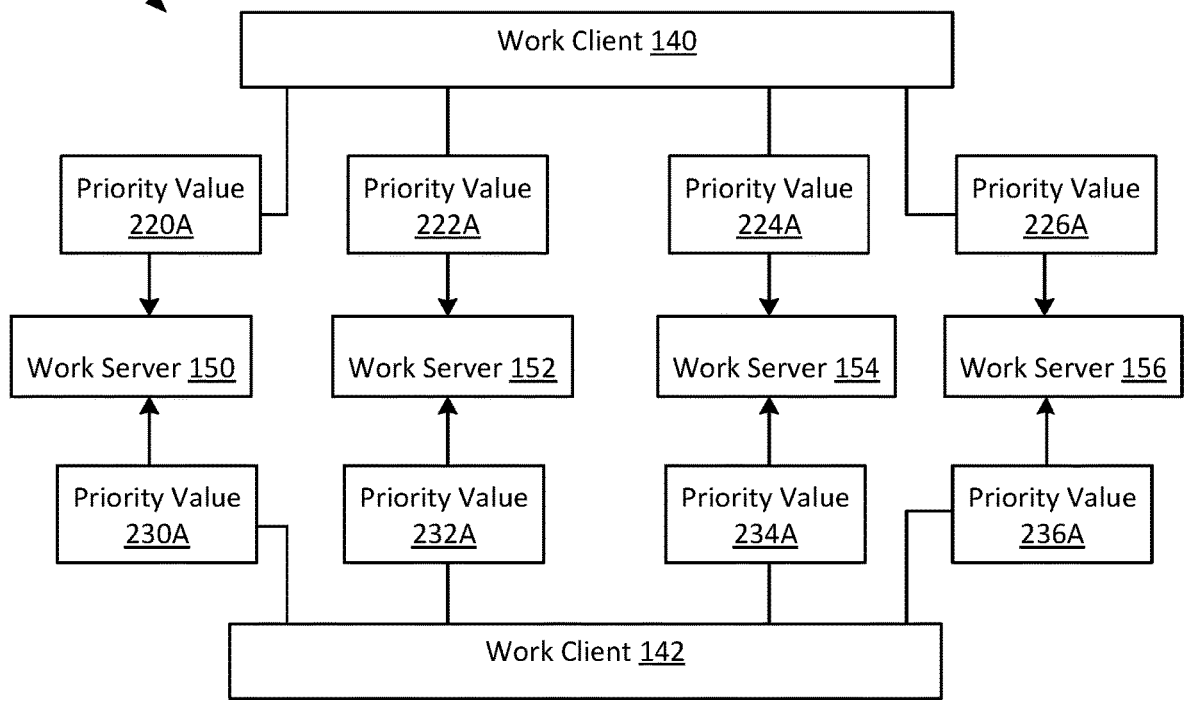
FIGS. 2A-F are block diagrams of competitive task allocation between a plurality of work servers and a plurality of work clients according to an example of the present disclosure.
Figure 2B:
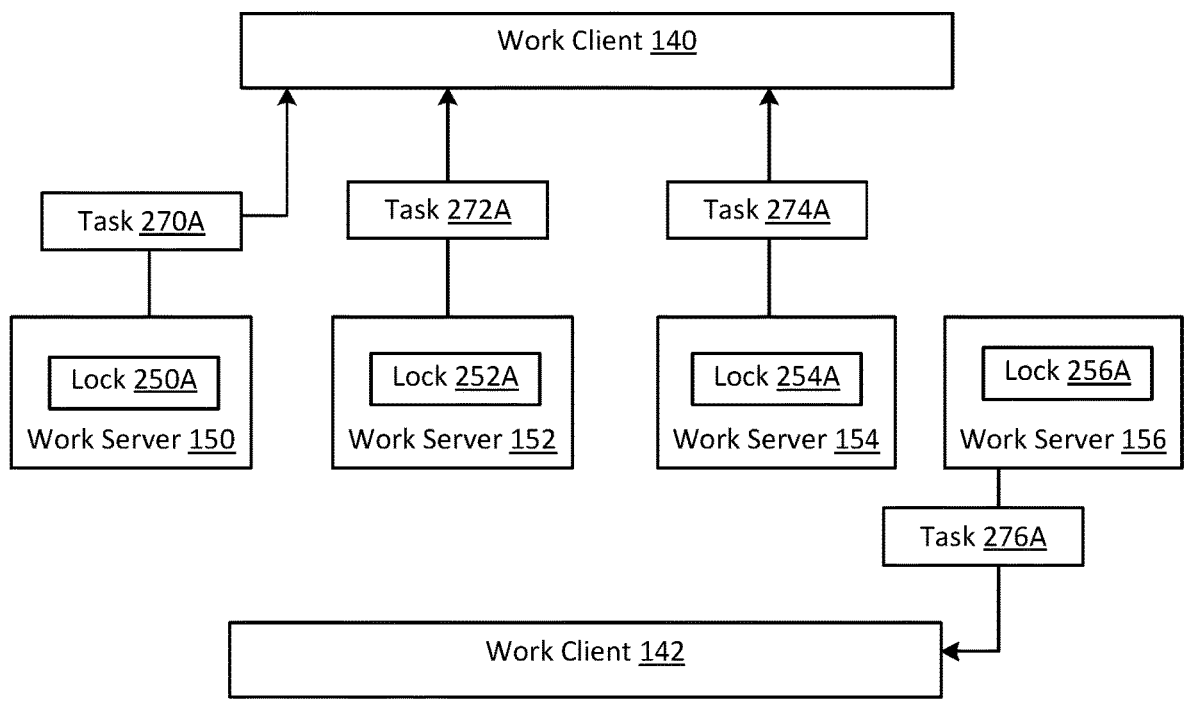

Example system 201 illustrated in FIG. 2B depicts a later state of system 200 after work clients 140 and 142 have sent their respective priority values to work servers 150, 152, 154, and 156. In the example, work server 150 determines that work client 140 will receive task 270A, assigns lock 250A to work client 140, and sends task 270A to work client 140; work server 152 determines that work client 140 will receive task 272A, assigns lock 252A to work client 140, and sends task 272A to work client 140; work server 154 determines that work client 140 will receive task 274A, assigns lock 254A to work client 144, and sends task 274A to work client 140; and work server 156 determines that work client 142 will receive task 276A, assigns lock 256A to work client 142, and sends task 276A to work client 142. In the example, due to the assignment of priority values by work clients 140 and 142, the initial distribution of tasks is not equal between work clients 140 and 142.

In an example, work server 150 may send a notice to work client 140 that work client 140 has been assigned lock 250A during a same communication session initiated by work server 150 sending priority value 220A. Task 270A may similarly be sent as part of the same communication session, optionally after receiving confirmation from work client 140 that work client 140 received the lock notice. In an example, lock 250A may be granted as a semi-permanent lock until affirmatively released by work client 140. In an example, either work client 140 or work server 150 may assign a lock duration for lock 250A. In an example, the timeout duration of priority value 220A may default as a lock duration, because work server 150 may be configured to presume that work client 140 has crashed and failed if work client 140 fails to send any further messages to work server 150 prior to the expiration of such timeout duration. In an example, work server 150 may be configured to attempt to contact work client 140 prior to terminating lock 150A and reassigning task 270A.

Figure 2C:
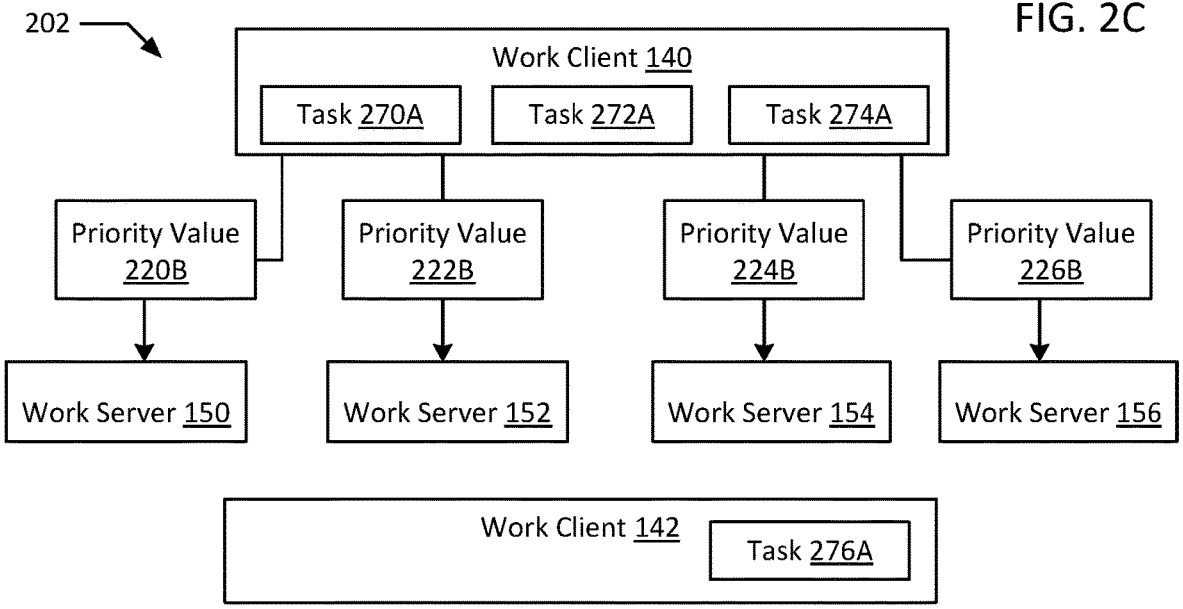

Example system 202 illustrated in FIG. 2C depicts a later state of system 201 where a lock request interval of work client 140 has expired prior to a lock request interval of work client 142. In an example, work clients 140 and 142 may be configured with independent lock request intervals. In an example, work client 140 may have been instantiated prior to work client 142. In an example, lock request intervals may be configured with a degree of randomness or jitter, to avoid lock request intervals of different work clients in system 200 from expiring at the same time. In an example, a work client's lock request interval is always shorter than the work client (or the system's default) priority value timeout duration in order to allow the priority value timeout duration to serve as a heartbeat for work client health. In an example, upon expiration of a work client's lock request interval, the work client sends a new round of priority value messages to each work server. In an example, introducing variation to different work clients' lock request durations helps to prevent the network connecting components of system 200 from being flooded by requests at the same time from multiple work clients. In an example, a work client is configured to periodically reassign priority values to each work server. This priority value reassignment may be synchronous or asynchronous with the lock request duration of the work client. In an example, priority values 220B, 222B, 224B, and 226B are updated priority values reassigning, for example, integer values 0 to 3 as compared to priority values 220A, 222A, 224A, and 226A. In alternative examples, new priority values 220B, 222B, 224B, and 226B may be equal to priority values 220A, 222A, 224A, and 226A either due to random chance or if priority value reassignment has yet to happen.

In an example, priority values 220B, 222B, 224B, and 226B are updated. For example, priority value 220B is 2, priority value 222B is 3, priority value 224B is 0, and priority value 226B is 1. In the example, while work client 140 is still executing tasks 270A, 272A, and 274A, and work client 142 is executing task 276A, priority values 220B, 222B, 224B, and 226B are sent by work client 140 to work servers 150, 152, 154, and 156. In the example, work servers 150, 152, 154, and 156 refresh the respective priority value validity durations associated with work client 140 based on receiving priority values 220B, 222B, 224B, and 226B. In some examples, receiving priority values 220B, 222B, and 224B automatically causes work servers 150, 152, and 154 to extend locks 250A, 252A, and 254A in favor of work client 140. In an example, locks may be automatically extended regardless of the priority values received. For example, locks 250A, 252A, and 254A are extended to the new priority value validity durations associated with priority values 220B, 222B, 224B, and 226B. Systems where tasks may take an unpredictable amount of processing time may be configured with automatic lock extensions, for example, due to lock extensions generally being required prior to processing on a task being completed. In other examples, extending lock duration may require an explicit lock extension message from work client 140. Such examples may be implemented in cases where units of work (e.g., processing tasks) are time bounded. For example, in the context of synchronizing changes in a distributed file system, a work client may be expected to process all incoming changes for the lock duration and to release the lock after the lock duration expires, only requesting an extension if processing cannot be completed in time (e.g., due to a large file update being made with little time remaining in a work client's lock duration).

Figure 2D:
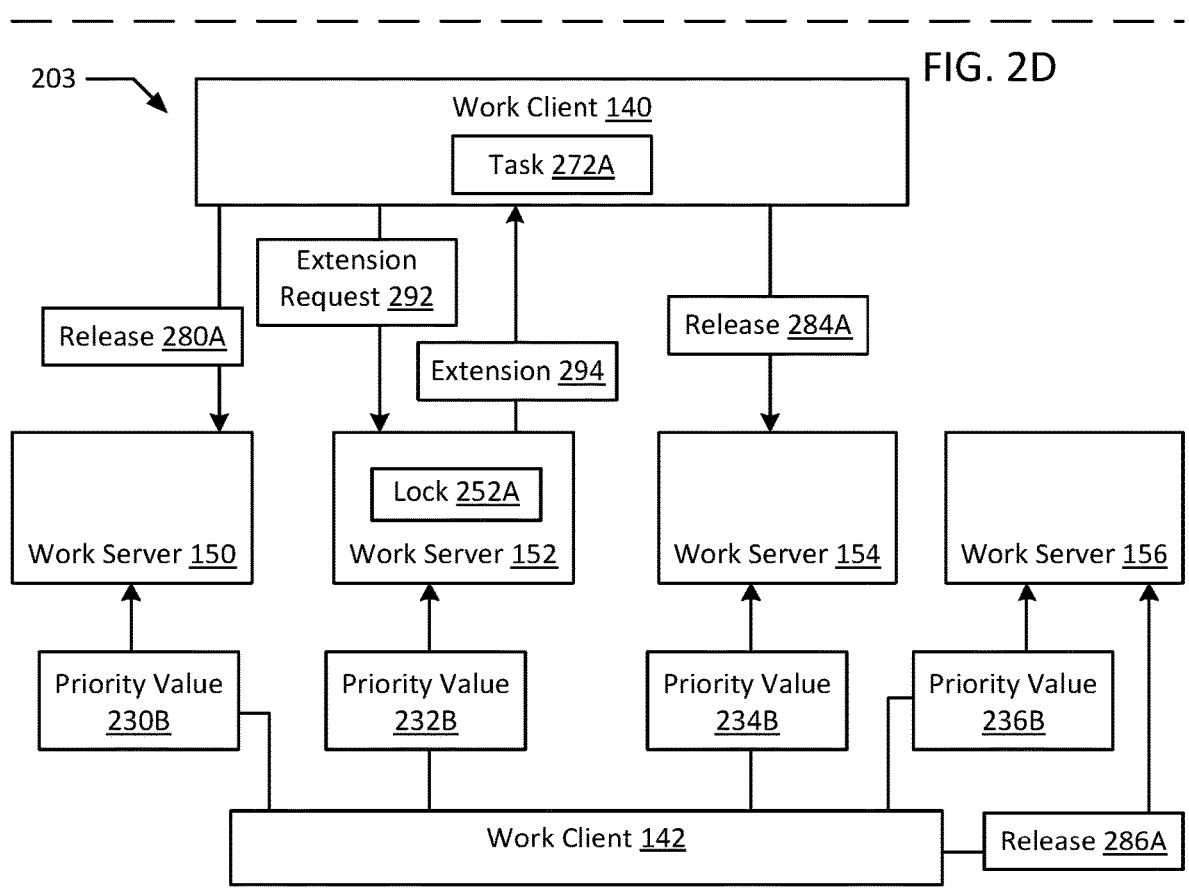

Example system 203 illustrated in FIG. 2D depicts a later state of system 202 in a system where lock durations are not automatically extended. In the example, work client 142 updates its priority values 230A, 232A, 234A, and 236A with new priority values 230B, 232B, 234B, and 236B. In the example, work client 142 has reassigned priority values prior to its lock request interval expiring, with priority value 230B set to 1, priority value 232B set to 2, priority value 234B set to 0, and priority value 236B set to 3. In an example, after work servers 150, 152, 154, and 156 receive new priority values 230B, 232B, 234B, and 236B, work server 150 receives release 280A (e.g., a notice to release lock 250A), work server 154 receives release 284A, and work server 156 receives release 286A. In an example, release 280A indicates that processing of task 270A is complete, release 284A indicates that processing of task 274A is complete, and release 286A indicates that processing of task 276A is complete. In an example, with the lock duration of lock 252A nearing expiration, work client 140 sends extension request 292 to work server 152 to extend lock 252A, and work server 152 responds with extension 294 granting the lock duration extension. For example, task 272A may require processing a larger amount of data than task 270A, and work client 140 may have retrieved additional data relating to task 272A to process from work server 152. In another example, task 272A is a time bounded task where additional data is added to task queue 172 late in the original lock duration of lock 252A. In an example, lock 252A is extended in favor of work client 140 even though priority value 222B is lower priority than priority value 232B because work client 140 has not responded to work server 152 indicating that task 272A has been processed. In the example, extending locks regardless of updated priority values helps prevent out of order execution of processing tasks.

In an example, after all of the messages depicted in FIG. 2D are sent between work clients 140 and 142, and work servers 150, 152, 154, and 156, each of work servers 150, 152, 154, and 156 has cached locally a priority value with a corresponding timeout duration or expiration time associated with work client 140 (e.g., priority values 220B, 222B, 224B, and 226B) and an addition priority value with a corresponding timeout duration or expiration time associated with work client 142 (e.g., priority values 230B, 232B, 234B, and 236B). In an example work server 152 is also currently locked for processing by work client 140 (e.g., lock 252A) based on extension 294, with a corresponding lock duration. In an example, the lock duration may be the same duration as the timeout duration for priority value 222B. In the illustrated example in FIG. 2D, work server 150 is storing currently valid priority values 220B (value of 2) and 230B (value of 1); work server 152 is storing currently valid priority values 222B (value of 3) and 232B (value of 2); work server 154 is storing currently valid priority values 224B (value of 0) and 234B (value of 0); and work server 150 is storing currently valid priority values 226B (value of 1) and 236B (value of 3).

Figure 2E:
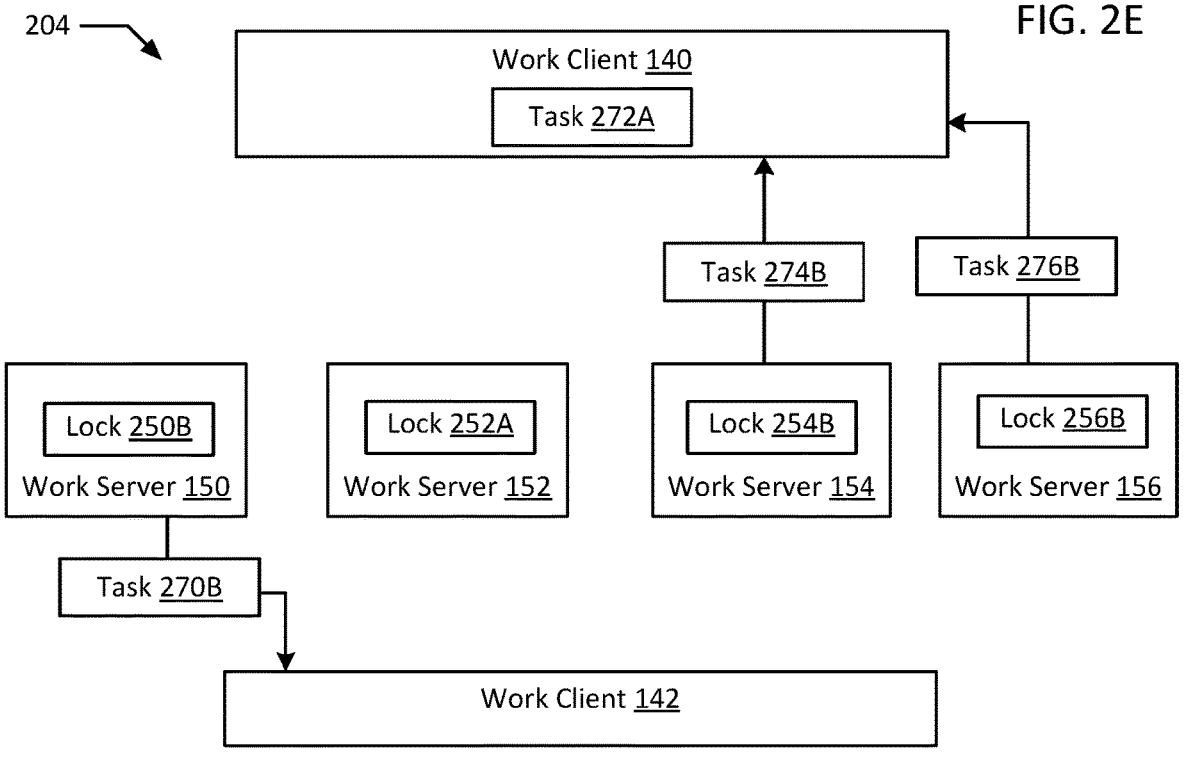

Example system 204 illustrated in FIG. 2E depicts a later state of system 203 where work servers 150, 154, and 156 determine which work client (e.g., work client 140 or 142) will receive their respective next tasks (e.g., tasks 270B, 274B, and 276B). In an example, each work server attempts to grant its next task and a corresponding lock to the work client with the then highest priority (e.g., lowest numerical value) cached priority value. In an example, a work server may be configured to send a message to a work client to verify its priority value prior to granting a lock or sending a task. In an example, a work server may be configured to wait for a subsequent priority value message from a work client to respond with a lock and task, which saves network traffic and allows work servers to be passive receivers that are not configured to proactively configured to contact work clients. In such examples, a work server may be configured to ignore the actual priority value sent in a subsequent priority value message after determining that a given work client will receive the work server's next task. For example, if work server 150 determines that priority value 220B (e.g, 2) is lower priority than priority value 230B (e.g., 1), and that work client 142 will receive the next task, this determination may be set to only be overturned if work client 142 fails to send a subsequent priority value message before its current priority value duration expires. Such a configuration prevents a prolonged period of not assigning work due to changing prioritizations between work clients 140 and 142 due to priority value reassignment. Otherwise, work server 150 may determine that work client 142's subsequent message includes a priority value lower priority than work client 140's value of 2, and then end up waiting for a new priority value from work client 140. In systems with many more work servers and clients than the illustrated example, this may result in a prolonged delay in assigning work. In an example where lock request intervals for work clients are configured to be relatively long time periods (e.g., minutes instead of seconds), it may be advantageous for throughput purposes to configure work servers to proactively grant locks and/or tasks based on cached priority values rather than waiting for a work client to contact the work server. In such examples, connection information to work clients may be cached by work servers in addition to priority values and timeout durations.

In an example, based on cached priority values, work server 150 assigns lock 250B to work client 142, and sends task 270B to work client 142; work server 154 assigns lock 254B to work client 140, and sends task 274B to work client 140; and work server 156 assigns lock 256B to work client 140, and sends task 276B to work client 1420. It should be appreciated that the timings illustrated in FIGS. 2A-F are illustrated in parallel to allow for ease of depiction only. Work servers 150, 152, 154, and 156 may be configured to be unaware of each others' existence and any shared timings may be based solely on any default timings configured in system 100 (e.g., default lock duration, default priority value expiration, etc.) In an example, the message timings relating to tasks 270B, 274B, and 276B are not intended to be related to each other. Instead, determinations of which work client will receive a next task, locking changes in favor of such work client, and sending the work client a task may be based on the completion time of the previous task from that work server (e.g., the receipt of release 280A by work server 150). In an example, if a work client with a highest cached priority value fails to respond to a lock query from a work server, or if the work client fails to send a subsequent priority value message before its current priority value expires, the work server may default its next task to the work client with the next highest cached priority value. For example, work server 150 may send a notification to work client 142 upon receipt of release 280A, notifying work client 142 that it will receive lock 250B and task 270B if work client 142 responds affirmatively. If the request times out based on a preconfigured timeout duration, work server 150 may then attempt to grant lock 250B and task 270B to work client 140. In an example, work server 154 caches two equal priority values 224B and 234B for work clients 140 and 142 respectively (both value 0). In an example, any suitable selection criteria may be used as a tie breaker. For example, work client 140 may be randomly selected for lock 254B. In another example, work client 140 may be selected because work client 140 previously processed task 272A. In another example, work client 140 may be determined to be physically closer to work server 154 based on network latency or IP address. In some examples, a work server may be configured to select a work client that did not process the previous task when encountering tied priority values to improve work distribution. For example, where throughput is more limited by bandwidth than latency, additional networking overhead establishing new networking sessions with a new work client may add negligible overall processing latency.

Figure 2F:
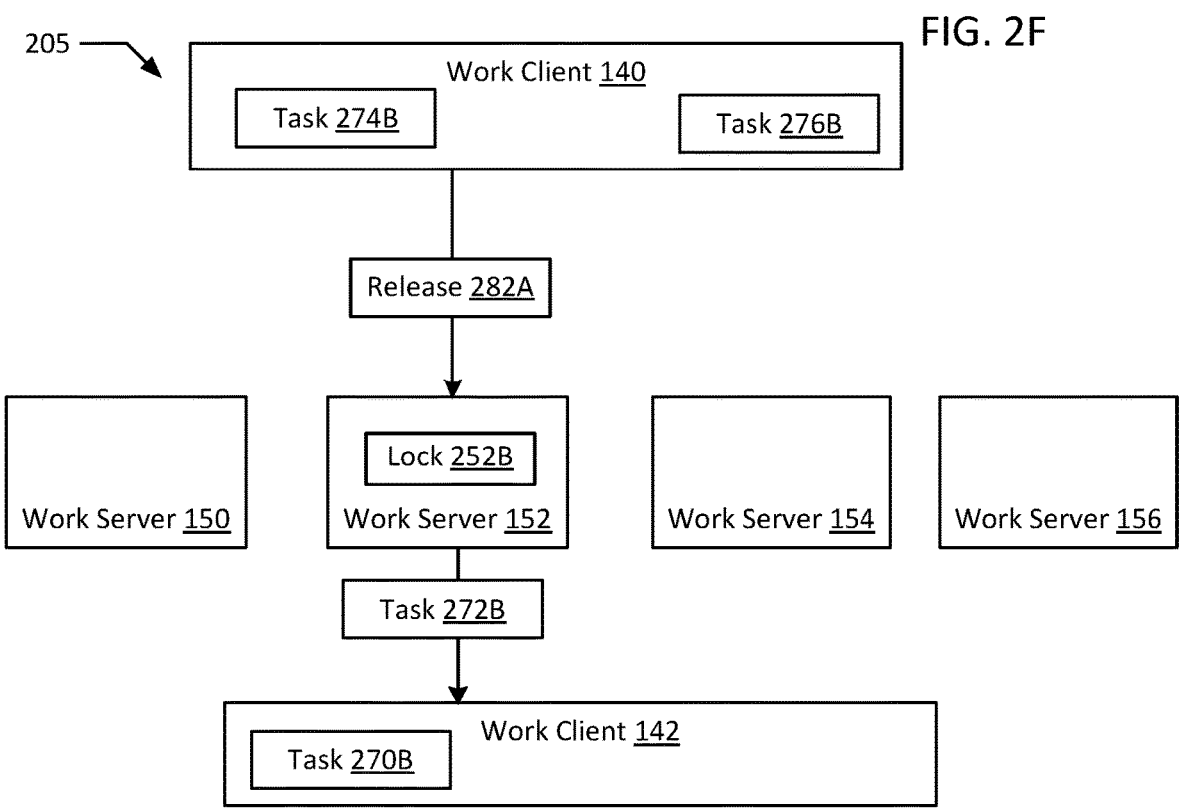

Example system 205 illustrated in FIG. 2F depicts a later state of system 204 where work client 140 just completes executing task 272A. In the example, work client 140 is currently executing tasks 270B and 276B, while work client 142 is executing task 274B. Work client 140 sends release 282A to work server 152 indicating that task 272A is complete and that lock 252A should be released. In the example, upon receiving release 282A, work server 152 releases lock 252A and evaluates its currently cached and non-expired priority values (e.g., priority values 222B and 232B). Priority value 222B (value of 3) is determined to be lower priority than priority value 232B (value of 2), and therefore lock 252B is granted for work client 142. In the example, task 272B is retrieved by work client 142 based on lock 252B being granted and work client 142 begins executing task 272B. Example system 205 therefore finishes with work client 140 and work client 142 each executing two tasks, evenly distributing the workload between work client 140 and 142. In an example, absolute even distribution is not typically required because as long as no work client is loaded past its maximum throughput capacity, no work client will become a bottleneck to processing throughput. Therefore allowing a degree of randomization in priority values enables relatively even workload distribution while allowing work clients to be dynamically added and removed without individual work clients needing to be aware of each other existence or other work clients' current workloads. Centralized tracking of work distribution is also unnecessary for relatively high efficiency outcomes. For example, in a typical system, one work client may be deployed to handle work from a plurality of work servers. Therefore, an ideal ratio of work clients to work servers will typically result in at least slightly excess processing capacity from deployed work clients to prevent the total processing power of deployed work clients from becoming a throughput bottleneck. In such systems, each work client should have sufficient free capacity to process a slightly higher workload resulting from random chance, and such higher workloads would typically be redistributed as the work client's current set of processing tasks is completed.

FIGS. 3A-F are block diagrams of a work server assigning processing tasks among a plurality of work clients according to an example of the present disclosure. Example system 300 is also based upon systems 100 and 200, but focused specifically on work distribution for tasks from work server 152. In an example, illustrated system 300 depicted in FIG. 3A begins with work clients 140 and 142 both discovering work server 152, for example, via index service 145. In alternative examples, any suitable notification mechanism may be utilized to inform work clients 140 and 142 that work server 152 is queuing processing tasks. For example, a periodic local broadcast by work server 152 may inform work clients on the same subnet or intranet as work server 152 that it seeks a work client.

In an example, work client 140 sends priority value 222A (e.g., value of 0) with an expiration 322A to work server 152. Similarly, work client 142 sends priority value 232A (e.g., value of 1) and an expiration 332A to work server 152. In an example, task 272A is sent to work client 140 in response to work client 140's priority value message including priority value 222A. In an example, work client 140 is selected based on priority value 222A being higher priority than priority value 232A. In another example, work client 142's priority value message with priority value 232A may be received by work server 152 after work server 152 has already sent task 272A to work client 140, and locked on to work client 140 as its current work client. For example, work server 152 may be configured to send task 272A to the first work client that contacts work server 152 if work server 152 lacks any currently cached priority values. In another example, work server 152 may wait for a timeout grace period for additional work clients to send priority values before selecting work client 140.

Figure 3A:
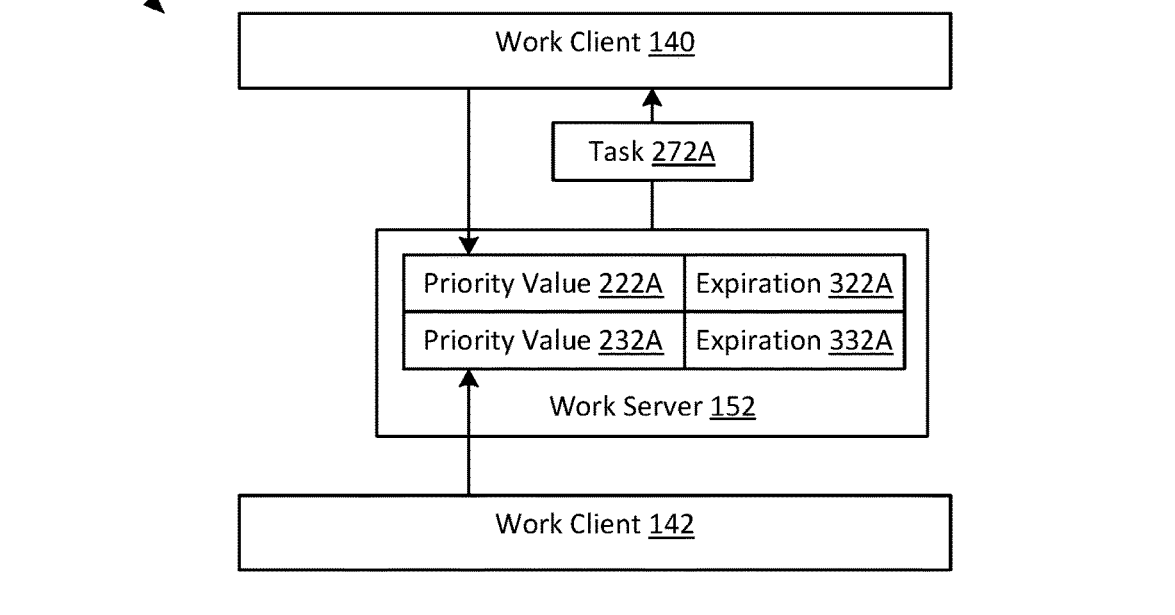
FIGS. 3A-F are block diagrams of a work server assigning processing tasks among a plurality of work clients according to an example of the present disclosure.
Figure 3B:
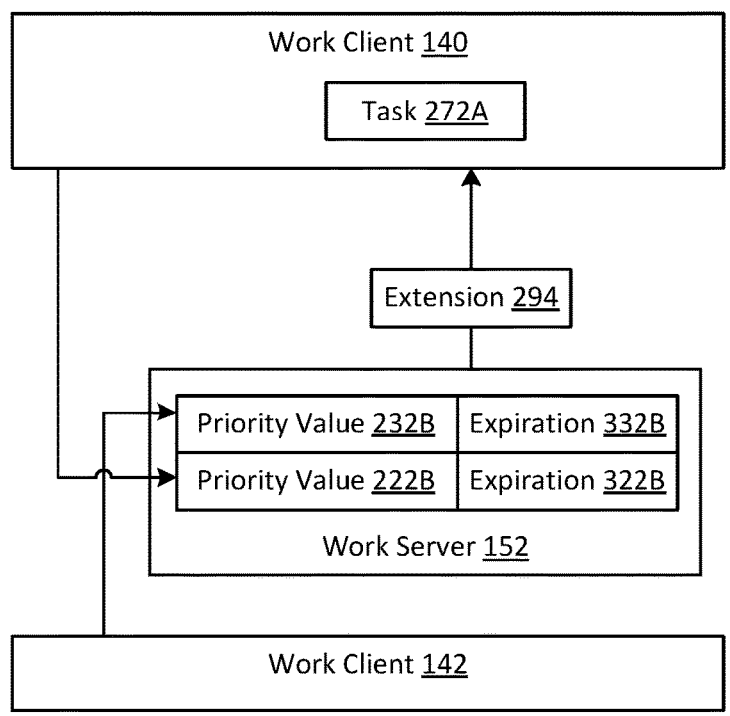

Example system 301 illustrated in FIG. 3B depicts work clients 140 and 142 updating their priority values to work server 152 while work client 140 is processing task 272A. In an example, updated priority value 232B of 2 is higher priority than updated priority value 222B of 3. In an example, expiration 322A is extended to expiration 322B, and expiration 332A is extended to expiration 332B. For example, work server 152 may be configured to reset an expiration duration for a given work client's priority value to a set default value each time a new priority value message is received from that work client, regardless of whether the priority value has changed. In such an example, work server 152 may set expiration 322A to an initial value of 5 minutes and a 5 minute countdown is initiated. In an example, with 2 minutes left in the countdown, priority value 222B is received, which resets the expiration time (e.g., expiration 322B) back to 5 minutes. In another example, a priority value message may be configured to explicitly include a validity duration for the included priority value 222B and expiration 322B may be set based on this validity duration. In an example, work clients 140 and 142 may be configured to introduce a variance or jitter to their lock request intervals, and therefore work server 152 receives priority values 222B and 232B at separate times (e.g., a minute apart). In such an example, expiration 332B and expiration 322B would also become differentiated based the difference in time for receiving priority values 222B and 232B. In illustrated example system 301, work client 140 is granted extension 294 to extend its lock on work server 152 and its time to complete processing task 272A based on work server 152 receiving priority value 222B prior to expiration 322A being triggered and prior to work client 140 sending a message indicating that processing of task 272A is complete. In the example, even though priority value 222B (value of 3) is lower priority than priority value 232B (value of 2), extension 322A is still granted to work client 140 because while a task is actively being processed, new priority values received are treated as heartbeats indicating that a given work client has not crashed or frozen, which allows work server 152 to determine that work client 140 is still actively processing task 272A and requires more time.

Figure 3C:
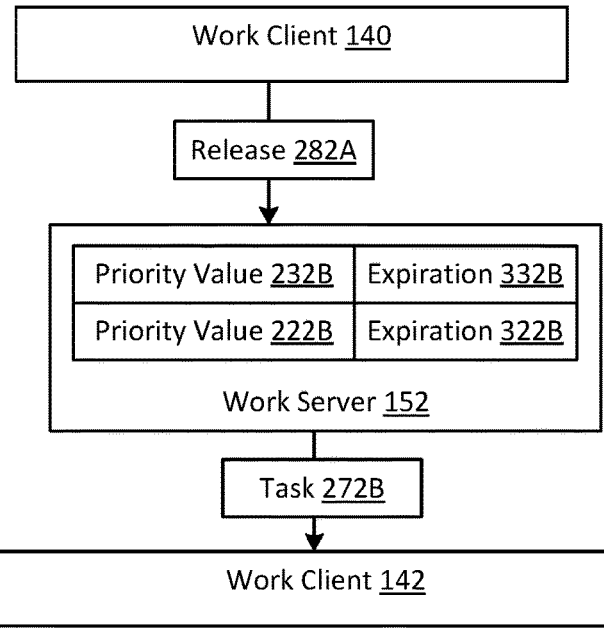

Example system 302 illustrated in FIG. 3C depicts work client 140 completing processing of task 272A, and sending release 282A to work server 152 to indicate that task 272A is complete and that work client 140's lock on work server 152 may be safely released. In the example, neither work client 140 nor work client 142 has sent any further priority value updates since sending priority values 222B and 232B. In the example, priority value 232B (value of 2) is higher priority than priority value 222B (value of 3), so work server 152 grants a new lock in favor of work client 142 and sends task 272B to work client 142. In an example, work client 142 may retrieve additional data related to task 272B from work server 152 or another source while processing task 272B.

Figure 3D:
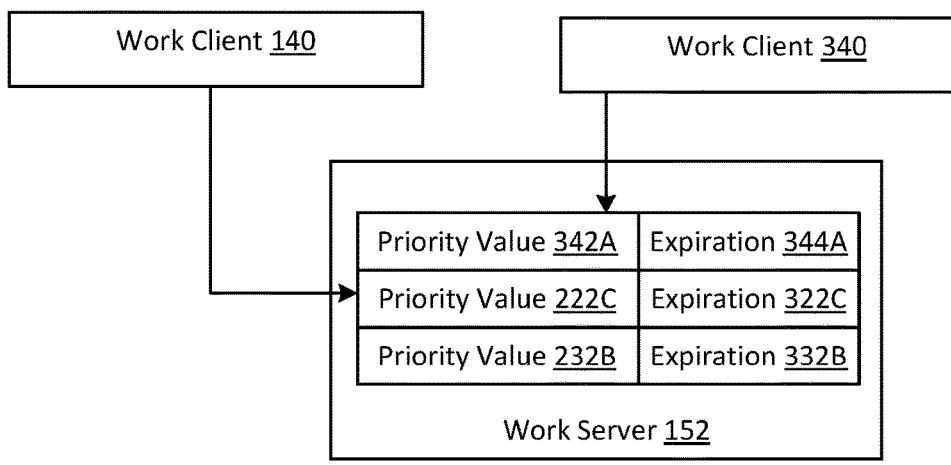

Example system 303 illustrated in FIG. 3D depicts system 302 while work client 142 is executing task 272B. In an example, work client 340 is instantiated while task 272B is being executed. For example, a job scheduler or guest orchestrator may determine that work client 140 and/or work client 142 is overworked (e.g., based on CPU utilization, memory utilization, etc.), and triggering the instantiation of work client 340 to share the load. In an example, at work client 340's instantiation time, all of work servers 150, 152, 154, and 156 are currently locked to either work client 140 or work client 142. Work client 340 announces its presence by determining the addresses of each of work servers 150, 152, 154, and 156 (e.g., by querying index service 145). In an example, work client 340 randomly assigns priority values to each of work servers 150, 152, 154, and 156, and sends these priority values to the respective work servers. In an example, work server 152 receives priority value 342A (value of 0) from work client 340, and sets an expiration 344A associated with priority value 342A in its cache of priority values. In an example, either before or after adding work client 340's priority value 342A as the highest priority value to work server 152's cache, work client 140 sends an updated priority value 222C (value of 1) to work server 152. In the example, expiration 322B is updated to expiration 322C based on receiving priority value 222C. In the example, work client 140's priority value 222C is elevated above work client 142's priority value 232B in a ranking maintained by work server 152.

Figure 3E:
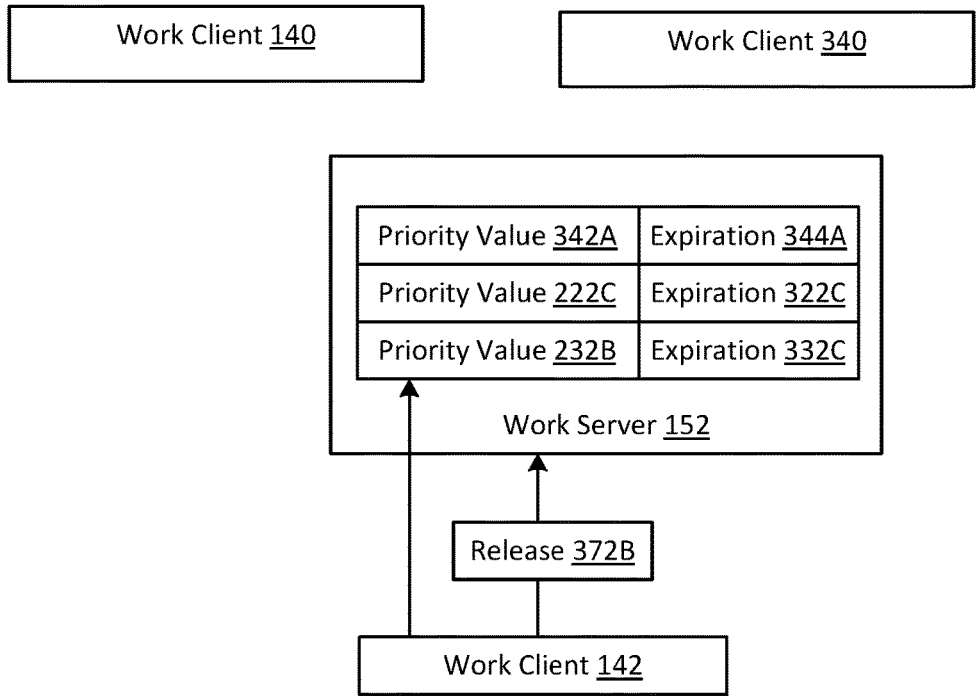

Example system 304 illustrated in FIG. 3E depicts work client 142 completing processing of task 272B. In the example, upon completing processing of task 272B, work client 142 sends work server 152 release 372B to release work client 142's lock on work server 152 and to indicate that task 272B is complete. In the example, work server 152 releases its lock in favor of work client 142 and begins to determine which work client will receive its next task. In an example, work client 142 is configured to resend its then current priority value (e.g., priority value 232B) to work server 152 upon completion of task 272B. In the example, resending priority value 232B resets expiration 332B to expiration 332C. In the example, priority value 232B (value of 2) is the lowest priority out of priority values 342A, 222C, and 232B.

Figure 3F:
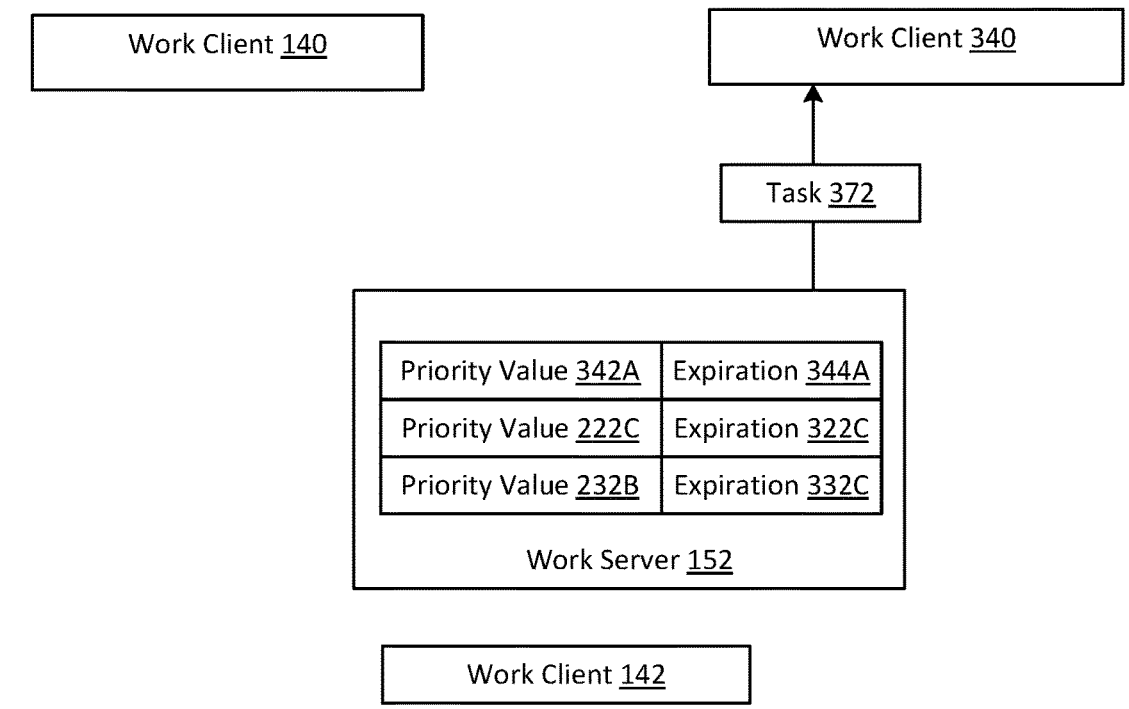

Example system 305 illustrated in FIG. 3F depicts work server 152 determining, based on cached priority values 342A, 222C, and 232B, that work client 340 has currently assigned the highest priority to work server 152's tasks. In the example, a lock is granted in favor of work client 340 and task 372 is sent to work client 340 for processing. Therefore, newly instantiated work client 340 begins receiving tasks to process within one task processing cycle of being instantiated.

Figure 4:
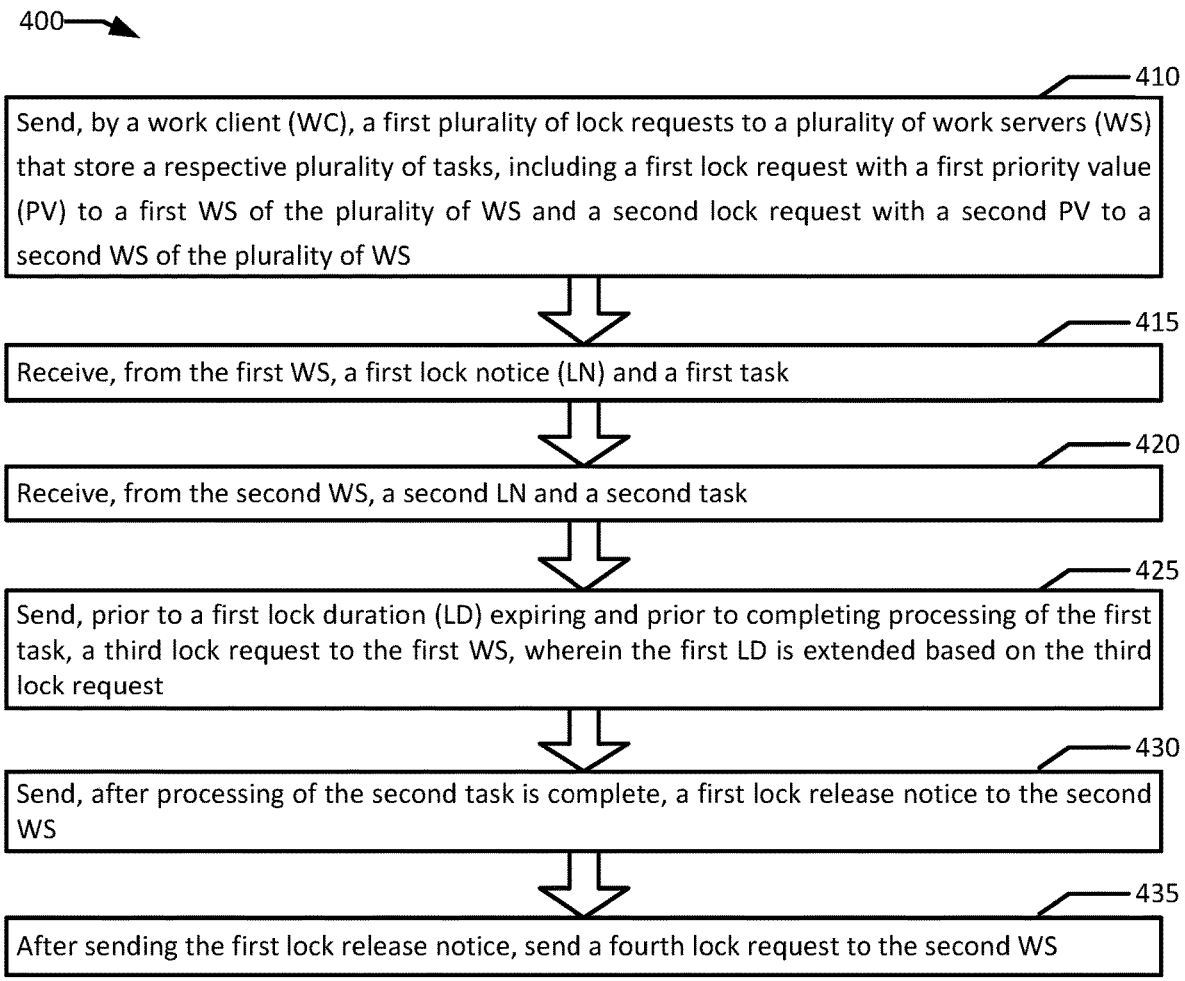
FIG. 4 is flowchart illustrating an example of a work client requesting tasks from a plurality of work servers according to an example of the present disclosure.

FIG. 4 is flowchart illustrating an example of a work client requesting tasks from a plurality of work servers according to an example of the present disclosure. Although the example method 300 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by work client 140.

Example method 400 may begin with sending, by a first work client (WC), a first plurality of lock requests to a plurality of work servers (WS) that store a respective plurality of tasks, including a first lock request with a first priority value (PV) to a first WS of the plurality of WS and a second lock request with a second PV to a second WS of the plurality of WS (block 410). In an example, work client 140 sends lock requests (e.g., messages containing priority values 220A, 222A, 224A, and 226A) to each active work server identified via index service 145 (e.g., work servers 150, 152, 154, and 156). In an example, each lock request (e.g., each of priority values 220A, 222A, 224A, and 226A) is associated with a respective validity duration. In an example, connection information (e.g., URLs) to each of work servers 150, 152, 154, and 156 is retrieved by work client 140 from index service 145. In an example, work client 140 generates a priority value pool from which one priority value may be assigned to each of work servers 150, 152, 154, and 156, with the priority values in the priority value pool configured to conform to a priority value standard of system 100. For example, system 100 may be configured to accept 0 and positive integer values for priority values. In such an example, work client 140's priority value pool may include the values 0, 1, 2, and 3, which may then be assigned via any suitable method to work servers 150, 152, 154, and 156 (e.g., randomly, pseudorandomly, by round robin, sequentially, etc.). Different work clients don't need to assign their priority values by the same method as long as all work clients within system 100 are using the same definitional standards for generating their priority value pools.

In an example, different work clients may also adjust the priority values in their priority value pools based on a priority factor. A priority factor may be used to place a soft limit the maximum number of work servers whose tasks a given work client may receive for processing. For example, work client 140 may have a priority factor of 1, and therefore may send priority values of 0, 1, 2, and 3 to work servers 150, 152, 154, and 156. Work client 142, however, may be deployed to a host (whether physical or virtual) with less available computing resources, and therefore may be configured with a priority factor of 1.2. As a result, work client 142's initial priority value pool of 0, 1, 2, and 3 may be multiplied by 1.2, resulting in values of 0, 1.2, 2.4, and 3.6. To conform these values to system 100's standards, the values may be rounded resulting in values of 0, 1, 2, and 4. Any work server receiving a priority value of 4 from work client 142 will always favor work client 140 because the priority value of 4 is lower priority than the lowest priority priority value that work client 140 can assign to a given work server. However, in the event that work client 140 crashes or freezes, work client 142 may still take over processing of tasks from such a work server based on having sent a lock request with a priority value of 4.

In an example, work server 150 aggregates processing tasks (e.g., tasks stored in task queue 170) for processing by compatible work clients (e.g., work client 140). In the example, new processing tasks may be continuously added to task queue 170 as tasks are processed by work client 140. For example, new simulation runs to execute in cases where work client 140 is configured to execute simulation runs, or new data to synchronize where work client 140 is configured to synchronize data stored across different data stores (e.g., for redundancy and/or performance). In an example, a task stored in task queue 170 may be any bounded unit of processing work. In an example, the type of bounded unit and the size of each bounded unit for a given task may be determined by a work server, a work client, or a combination of both. For example, a bounded unit may be a time bounded unit, where a given work client is assigned to process inputs from a work server continuously for a period of time. In such systems, a work client may be configured to continuously retrieve data to process until the configured time limit of the task is complete. It may be necessary to extend the time period to complete processing of a final set of input data by the work client. An alternative to time bounded tasks may be data size bounded tasks, where a given task is defined by an amount of data retrieved by the work client to be processed as input data. A degree of flexibility in a data size limit may be required, for example, where additional data is required by the work client to complete processing a given task. A task may also be quantity delimited. For example, a task may be configured to be ten simulation runs regardless of how long it takes a work client to execute the simulation runs or how much data needs to be retrieved to execute the runs. Tasks may also be defined with multiple size limits (e.g., both a size and a quantity limit) to keep a given work server's work from being continuously locked by a given work client. In an example, a work server or a work client may also request to adjust the current definitions for quantizing the work processed as a task. For example, tasks may be configured to be larger where there are fewer work clients instantiated so that less processing and networking overhead is required for task distribution (e.g., a work client may then extend its lock request interval). Alternatively, to allow work to be more evenly distributed, work servers may request task sizes to be reduced and/or lock request intervals to be shortened by work clients as more work clients are brought online. In an example, whenever a new work client is brought online and a work server receives a new lock request notice from a work client that it is not currently aware of, the work server may require its then active and locked work client to reduce its task size definitions and/or its lock request interval to speed up spreading work to the newly instantiated work client.

A first lock notice (LN) and a first task are received from the first WS (block 415). In an example, work server 152 grants work client 140 lock 252A, and sends work client 140 task 272A to process based on receiving a lock request with priority value 222A. In the example, work server 150 may send a separate message to work client 140 that lock 252A was granted, or work server 150 may include the lock notice as part of a message associated with task 272A. For example, work server 150 may send a message to work client 140 including the lock notice for lock 252A, instructions for executing task 272A, and connection information for additional data sources to connect to in conjunction with executing task 272A (e.g., input data, storage volumes for storing results). In an example, while processing task 272A, work client 140 may send additional requests to work server 150 to retrieve additional data to process after finishing processing of an initial data set sent to work client 140 by work server 150. Depending on the how processing workloads are divided for defining task 272A (e.g., time, size, quantity, etc.) having work server 150 push data to work client 140 may be more advantageous from a latency perspective than having work client 140 query for data to retrieve and process. A second LN and a second task are received from the second WS (block 420). In an example, work client 140 also receives lock 250A and task 270A from work server 150 based on its lock request notice including priority value 220A.

Prior to a first lock duration (LD) expiring and prior to completing processing of the first task, the first WC sends a third lock request to the first WS (block 425). In an example, the first LD is extended based on the third lock request. In an example, work client 140 sends another lock request with updated priority value 222B to work server 152 prior to finishing processing on task 272A. In the example, work server 152 extends the duration of lock 252A based on receiving this lock request. For example, the lock request including priority value 222B is treated as an extension request (e.g., extension request 292). In an example the duration of lock 252A may be dictated by either work client 140 or work server 152. For example, other than time bounded tasks, an affirmative lock duration may be unnecessary as work client 140 may be granted as much time as necessary to complete task 272A. However, a default lock duration may be set based on the validity duration of work client 140's then current priority value 222A or 222B. For example, work server 152 may be configured to determine that work client 140 has experienced a failure if work server 152 fails to receive any communication from work client 140 before its then current priority value expires. In such a scenario, work server 152 may reassign task 272A to another work client, possibly after waiting for a grace period to elapse and/or after attempting to contact work client 140. In an example, priority value 222B is lower priority than priority value 222A. In an example, priority value 222B is sent to work server 152 based on a lock request interval of work client 140 expiring, and work client 140 is configured to configure its lock request interval to be shorter than the shortest lock duration granted by any of work servers 150, 152, 154, or 156. In an example, work client 140's lock request interval is periodically updated. Updates may be based on the lock durations granted by work servers 150, 152, 154, and/or 156 (either longer or shorter). In addition, each cycle of lock requests bearing priority values may have a randomized delay added to allow each work clients' lock requests to be temporally separated from those of other work clients.

In an example, prior to receiving priority value 222B, work server 152 receives a lock request from work client 142 that includes priority value 232B, and priority value 232B is higher priority than priority value 222A and/or 222B. In an example, work client 140's lock duration for lock 252A expires, releasing lock 252A with task 272A incomplete. In the example, work server 152 reassigns task 272A to work client 142. In an example, work server 152 first attempts to query work client 140 for its status prior to reassigning task 272A.

After processing of the second task is complete, the first WC sends a first lock release notice to the second WS (block 430). In an example, work client 140 sends a lock release notice with release 280A after processing of task 270A is complete. After sending the first lock release notice, send a fourth lock request to the second WS (block 435). In an example, after lock 250A is released, work client 140 sends a new lock request to work client 150. In an example, prior to receiving the new lock request, work server 150 receives priority value 230B in a lock request from work client 142. In the example, in response to receiving the lock release notice with release 280A from work client 140, task 270B is sent to work client 142. In an example, work server 150 requests confirmation of priority value 230B prior to sending task 270B, and only sends task 270B after work client 142 responds to work server 150's query. In another example, work sever 150 is configured to wait for a new lock request from work client 140 prior to assigning task 270B, and compares a priority value in the new lock request after release 280A is received to priority value 230B before assigning task 270B to work client 140 instead.

Figure 5:
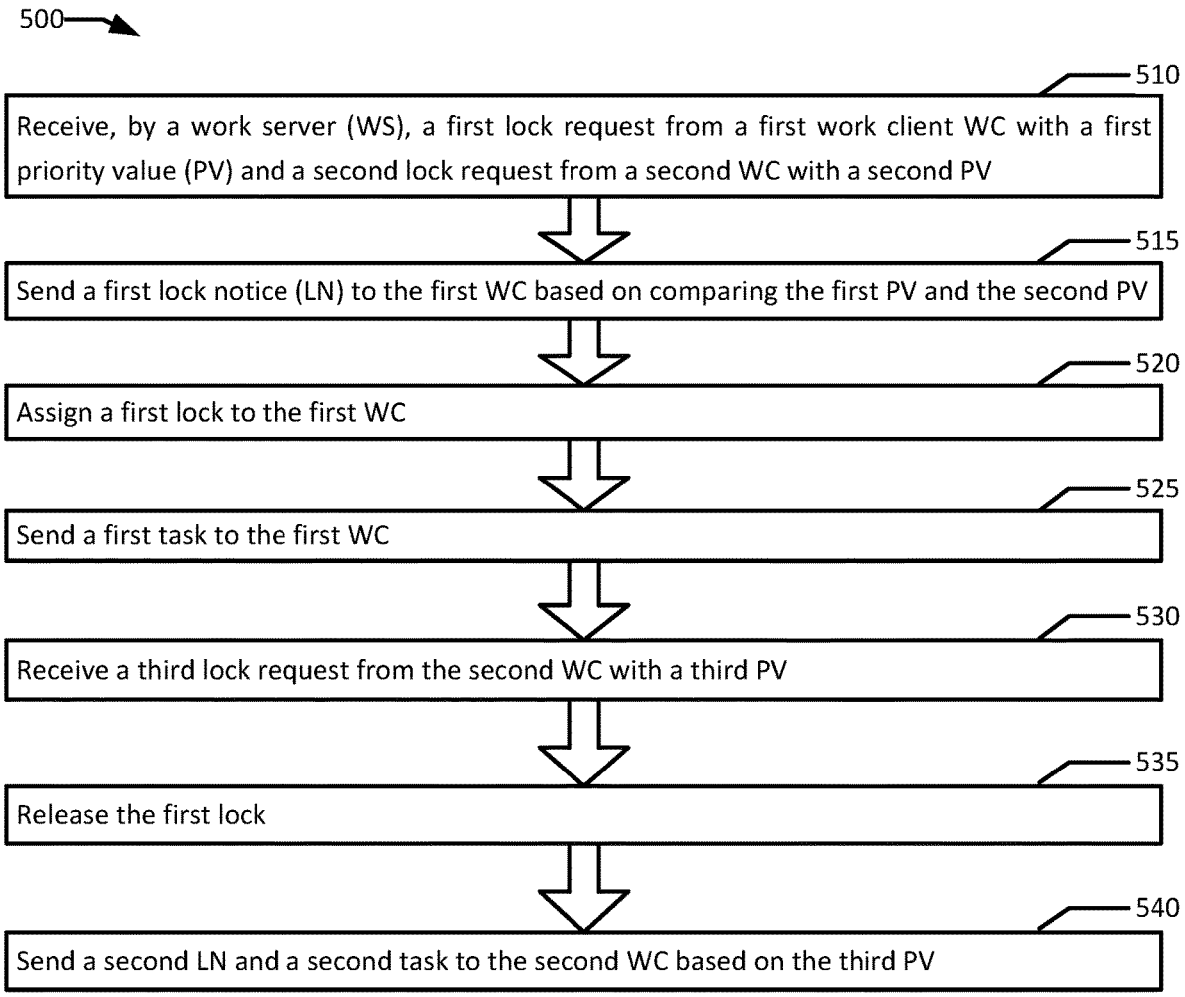
FIG. 5 is flowchart illustrating an example of multiple work clients requesting tasks from a particular work server according to an example of the present disclosure.

FIG. 5 is flowchart illustrating an example of multiple work clients requesting tasks from a particular work server according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by work server 152.

Example method 500 may begin with receiving, by a work server (WS), a first lock request from a first work client WC with a first priority value (PV) and a second lock request from a second WC with a second PV (block 510). In an example, work server 152 receives a lock request from work client 140 with priority value 222A and a lock request from work client 142 with priority value 232A. In an example, the lock request with priority value 222A includes a validity timeout indicating a duration that priority value 222A is valid for. In an example, expiration 322A associated with priority value 222A is set based on the validity timeout. As described further above, the range of priority values assignable to each work server by each work client may be adjusted by a priority factor.

A first lock notice (LN) is sent to the first WC based on comparing the first PV and the second PV (block 515). In an example, after comparing priority values 222A and 232A, work server 152 sends a lock notice to work client 140 indicating to work client 140 that work client 140 will receive a lock from work server 152. A first lock is assigned to the first WC (block 520). In an example, lock 252A of work server 152 is assigned to work client 140. A first task is sent to the first WC (block 525). Task 272A is then sent to work client 140 for processing. In an example, task 272A is a bounded unit of processing work bounded by time, data size, or subtask count as discussed previously herein. In an example, the definition of the bounded unit of task 272A is communicated to work client 140 by work server 152 in the lock notice informing work client 140 and/or in metadata associated with task 272A. In an example, work server 152 may be unaware of the exact bounds of task 272A, and work client 140 may dynamically extend lock 252A in order to complete processing of task 272A. For example, determining the amount of data that needs to be processed to complete task 272A may be impossible without first starting to process task 272A. For example, where task 272A is a task to reconcile changes in a large file stored to a distributed storage system, the size of the file and/or the size of the changes may be determined after metadata pertaining to the file is parsed by work client 140, and therefore work server 152 may be unaware of the amount of processing work that needs to be performed to complete task 272A. Similarly, work client 140 may need to retrieve more data from work server 152 to complete processing of task 272A.

In an example, prior to lock 252A expiring, work client 140 sends a new lock request with priority value 222B and work server 152 extends lock 252A in response to receiving priority value 222B. In an example, work server 152 sends work client 140 a confirmation of the extension (e.g., extension 294). In another example, an acknowledgement that its lock request was received may be sufficient confirmation for work client 140. For example, if a default lock duration is based on expiration 322A, then the lock request with priority value 222B when received would update the lock duration to correspond to expiration 322B. In an example, lock 252A is extended even though priority value 222B is lower priority than priority value 232B and/or 232A. In an example, work server 152 may be configured to send recommended lock durations to work client 140. For example, work server 152, in response to receiving lock requests from new work clients, may request work client 140 to shorten its lock request interval, allowing priority value expirations and lock durations to also be shortened.

A third lock request is received from the second WC with a third PV (block 530). In an example, work client 142 sends a lock request updating its priority value to priority value 232B. In an example, work client 140's lock duration for lock 252A expires, and task 272A is reassigned to work client 142. In an example, to prevent data loss due to failed work clients, input data associated with a particular task is not deleted by work server 152 until the task is confirmed as complete.

The first lock is released (block 535). In an example, work server 152 releases lock 252A. For example, a lock duration of lock 252A expires. In another example, work client 140 informs work server 152 that processing of task 272A is complete and to release lock 252A (e.g., via release 282A). A second LN and a second task are sent to the second WC based on the third PV (block 540). In an example, task 272B is assigned to work client 142 based on priority value 232B being higher priority than priority value 222B. In an example, task 272B is a new task added to task queue 172 after processing of task 272A began. In an example, task 272B is smaller in size than task 272A. For example, work server 152 reduces the lock duration for its lock granted to work client 142 as compared to work client 140 based on receiving a lock request from work client 340. In an example, prior to sending task 272B to work client 142, work server 152 requests confirmation of priority value 232B from work client 142.

Figure 6:
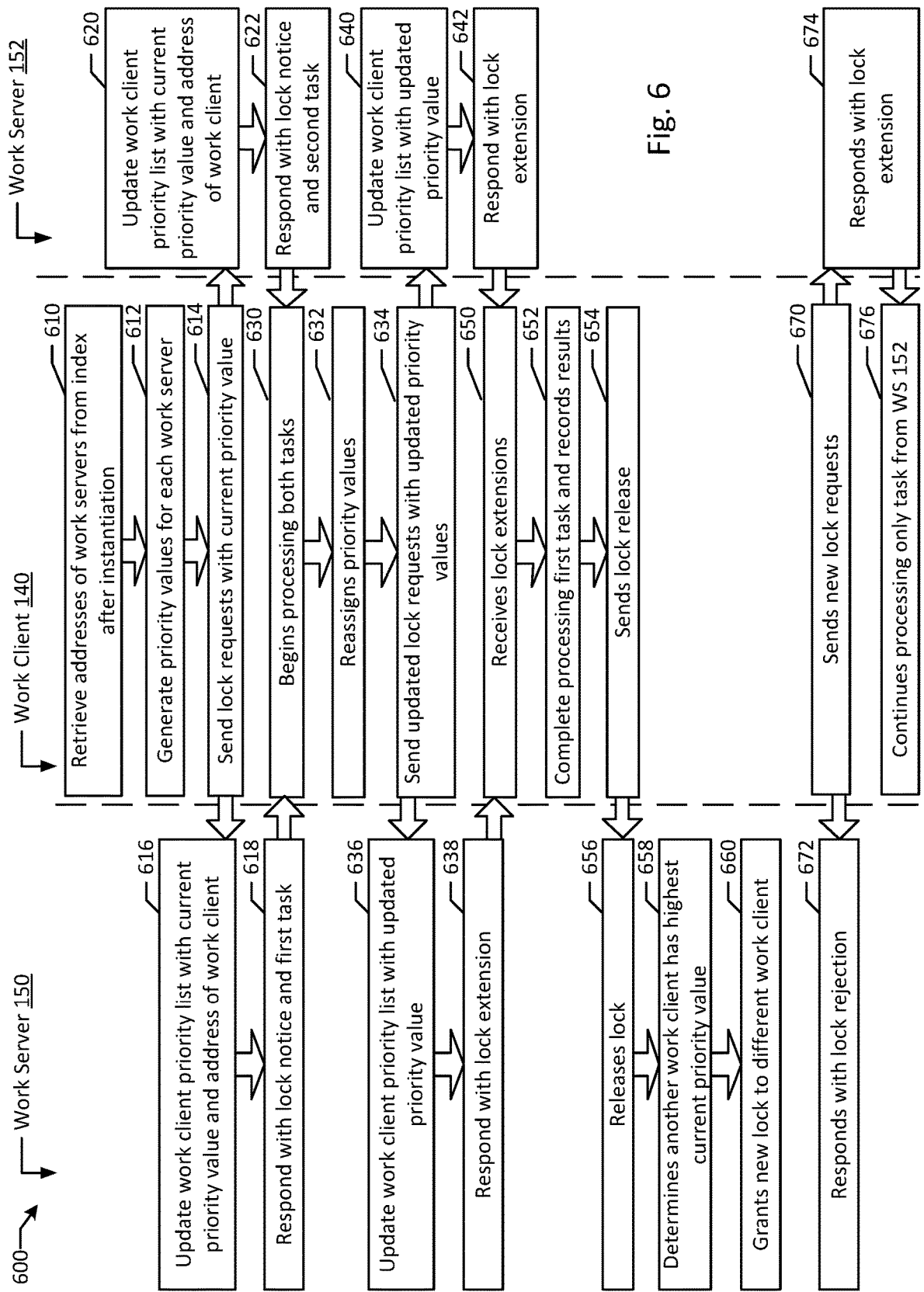
FIG. 6 is a flow diagram of an example of a newly instantiated work client retrieving and processing tasks from a plurality of work servers according to an example of the present disclosure.

FIG. 6 is a flow diagram of an example of a newly instantiated work client retrieving and processing tasks from a plurality of work servers according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, work client 140 is instantiated and requests tasks from work servers 150 and 152 to process.

In example system 600 illustrated in FIG. 6, work client 140 retrieves the IP addresses of work servers 150 and 152 from index service 145 after work client 140 is instantiated (block 610). Work client 140 generates priority values 220A and 222A for work servers 150 and 152 (block 612). Work client 140 then sends a lock request with priority value 220A to work server 150, and a lock request with priority value 222A to work server 152 (block 614). Work server 150 updates its work client priority list stored in memory with the current priority value 220A (e.g., 0) as well as the IP address of work client 140 (block 616). Upon determining that priority value 222A is the highest (and only) priority value in work server 150's priority value list, work server 150 responds to work client 140 with lock 250A and task 270A (block 618). Similarly, work server 152 updates its work client priority list with priority value 222A (e.g., 1) and work client 140's IP address (block 620). Work server 152 then responds to work client 140 with a lock notice indicating lock 252A was granted and sends task 272A to work client 140 (block 622).

Work client 140 begins processing tasks 270A and 272A (block 630). While processing tasks 270A and 272A, work client 140 reassigns priority values to work servers 150 and 152 (block 632). Work client 140 sends updated lock requests with updated priority value 220B to work server 150 and priority value 222B to work server 152 (block 634). Work server 150 updates its work client priority list with priority value 220B in its entry for work client 140 (block 636). Work server 150 then responds with a lock extension for lock 250A based on receiving the updated priority value 220B (block 638). Similarly, work server 152 updates its work client priority list with priority value 222B in its entry for work client 140 (block 640). Work server 152 then responds with a lock extension for lock 252A based on receiving the updated priority value 222B (block 642). Work client 140 receives the lock extensions (block 650). Work client 140 continues processing tasks 270A and 272A. Work client 140 first completes processing task 270A and records results (block 652). Work client 140 then sends a lock release notice to work server 150 (e.g., release 282A) while still processing task 272A (block 654). Work server 150 releases lock 250A based on receiving release 282A (block 656). Work server 150 then determines that work client 142 has a higher priority value in its priority value list (e.g., priority value 230B) than priority value 220B (block 658). Work server 150 grants lock 250B to work client 142 and sends task 270B to work client 142 (block 660).

Subsequently, still prior to completing task 272A, work client 140 again sends new lock requests to work servers 150 and 152 (block 670). In an example, work client 140 has again reassigned priority values prior to sending the new round of lock requests. In another example, work client 140 resents priority values 220B and 222B. Work server 150 rejects the lock request based on already being locked to work client 142 (block 672). Work server 152 responds to the new lock request with another lock extension of lock 252A (block 674). For example, work client 140 has not timed out a lock duration and has not reported that task 272A is complete, so work server 152's default response to a new lock request is a lock extension. Work client 140 continues processing task 272A from work server 152 (block 676).

Figure 7A:
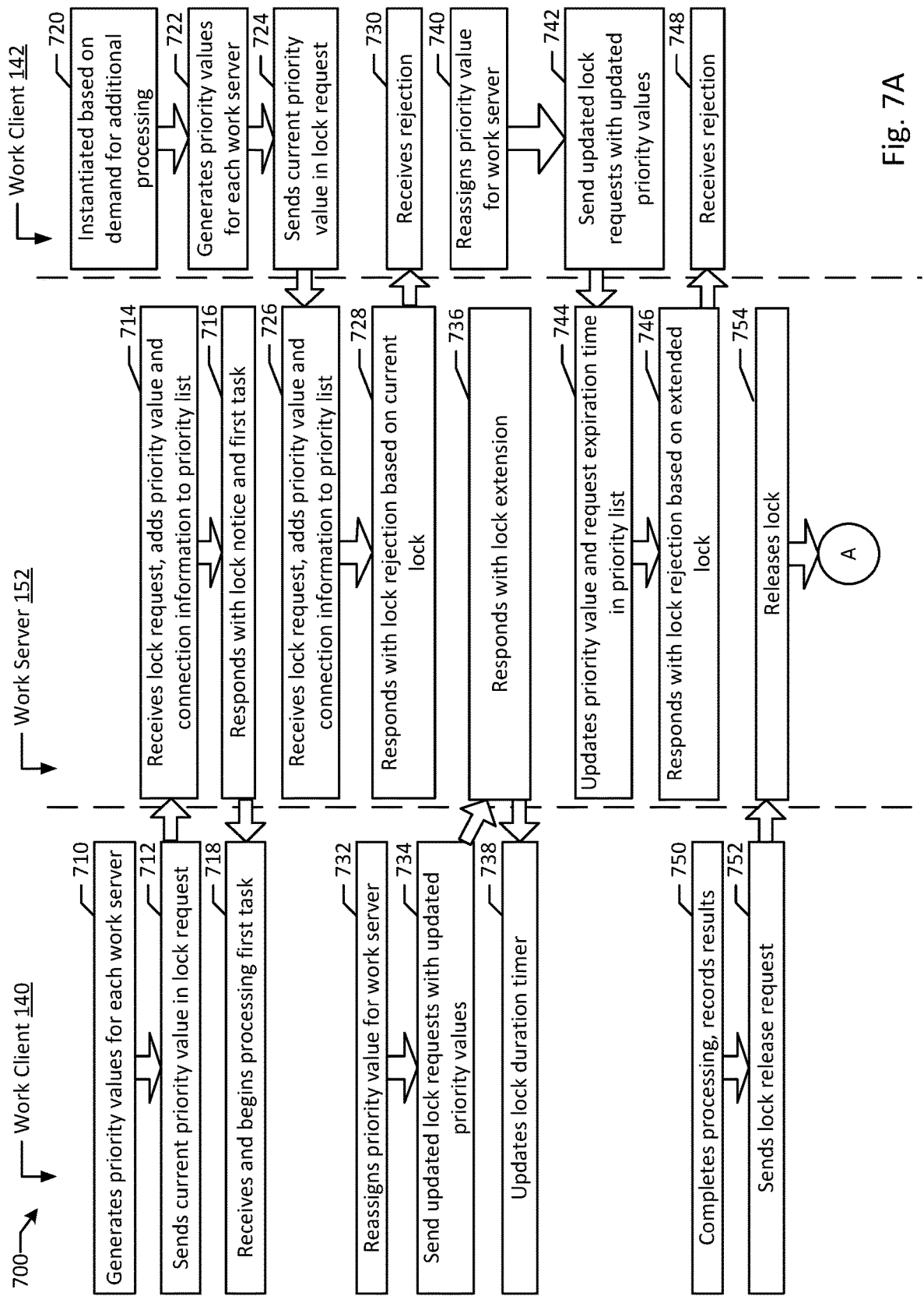
FIGS. 7A-B are flow diagrams of an example of a work server allocating processing tasks to a plurality of competitive work clients according to an example of the present disclosure.
Figure 7B:
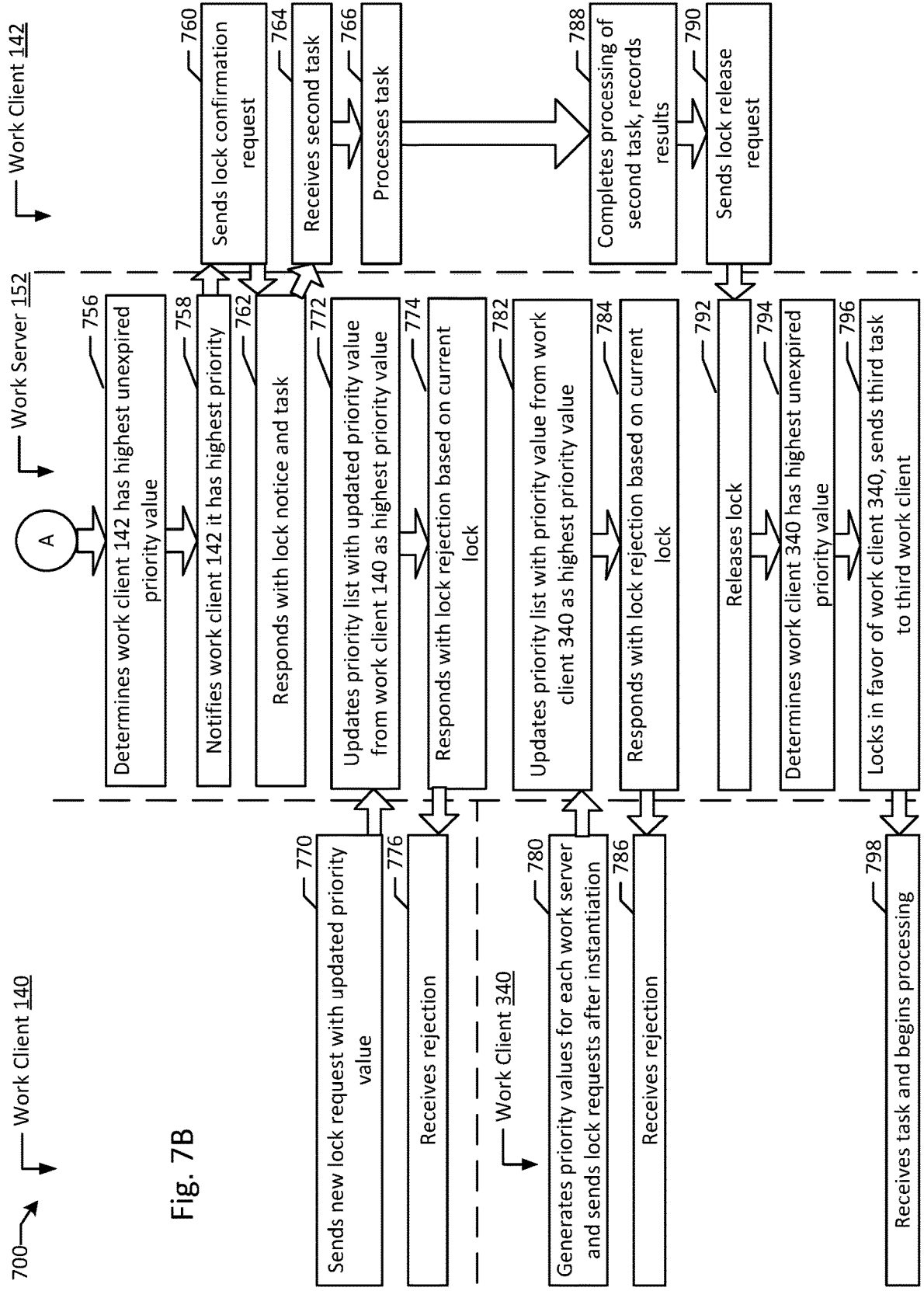

FIGS. 7A-B are flow diagrams of an example of a work server allocating processing tasks to a plurality of competitive work clients according to an example of the present disclosure. Although the examples below are described with reference to the flow diagram illustrated in FIGS. 7A-B, it will be appreciated that many other methods of performing the acts associated with FIGS. 7A-B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700 work server 152 allocates tasks among work client 140, 142, and 340.

In example system 700 illustrated in FIGS. 7A-B, a first work client 140 is instantiated. Work client 140 generates priority values for each identified work server including priority value 222A associated with work server 152 (block 710). Work client 140 sends priority value 222A in a lock request to work server 152 (block 712). Work server 152 receives the lock request, and adds the priority value 222A and connection information for work client 140 to its work client priority list (block 714). Work server 152 responds to work client 140's lock request with a lock notice indicating that lock 252A is granted to work client 140, and sends task 272A to be processed (block 716). Work client 140 receives task 272A and begins processing the task (block 718).

Work client 142 is instantiated after work client 140 based on detected demand for additional processing (block 720). For example, task queue 172 may have reached a threshold size triggering an additional work client to be deployed. Work client 142 generates priority values for each detected work server (block 722). After lock 252A is granted, work client 142 sends priority value 232A in a lock request to work server 152 (block 724). Work server 152 receives the lock request, adds priority value 232A to its priority value list, and stores connection information for work client 142 (block 726). Work server 152 rejects the lock request from work client 142 based on current lock 252A to work client 140 (block 728). Work client 142 receives the rejection (block 730).

After work client 140 begins processing task 272A, work client 140 reassigns a new priority value 222B to work server 152 (block 732). Work client 140 sends updated lock requests, including an updated lock request to work server 152 with updated priority value 222B (block 734). Work server 152 responds to the updated lock request with a lock extension for lock 252A (e.g., extension 294) (block 736). In response, work client 140 updates a lock duration timer associated with its current lock 252A for work server 152 (block 738). In an example work client 140 may be configured to resend another round of updated lock requests prior to its then shortest lock duration timer for any work server expiring to ensure that all of its associated work servers receive a heartbeat message in the form of a lock request indicating that work client 140 is still executing.

Work client 142 reassigns a new priority value 232B to work server 152 (block 740). Work client 142 sends updated lock requests, including an updated lock request to work server 152 with updated priority value 232B (block 742). Work server 152 updates priority value 232A to be replaced with priority value 232B in its work client priority list (block 744). Work server 152 rejects the lock request from work client 142 again, based on extended lock 252A (block 746). Work client 142 receives the rejection (block 748). Work client 140 completes processing of task 272A and records results (block 750). Work client 140 sends lock release request (e.g., release 282A) to work server 152 (block 752). Work server 152 releases lock 252A (block 754).

After releasing lock 252A, work server 152 verifies that none of the priority values in its work client priority list are expired and determines that work client 142's priority value 232B is higher priority than priority value 222B, and therefore work client 142 has the highest unexpired priority value (block 756). Work server 152 notifies work client 142 that it has the highest current priority (block 758). Work client 142 responds with a lock confirmation request, indicating it is ready to receive a lock from work server 152 and a task to process (block 760). Work server 152 responds with a lock notice for lock 252B and task 272B for work client 142 to process (block 762). Work client 142 receives task 272B (block 764). Work client 142 begins processing task 272B (block 766). Meanwhile, after task 272B is assigned to work client 142, work client 140 reassigns a new priority value 222C to work server 152 and sends an updated lock request to work server 152 with updated priority value 222C (block 770). Work server 152 updates priority value 222B to be replaced with priority value 222C in its work client priority list (block 772). Work server 152 rejects the lock request from work client 140, based on lock 252B to work client 142 (block 774). Work client 140 receives the rejection (block 776).

Work client 340 is instantiated and generates priority values for each detected work server including priority value 342A associated with work server 152 that is sent in a lock request to work server 152 (block 780). Work server 152 updates its work client priority list with priority value 342A from work client 340 as the highest current priority value (block 782). Work server 152 responds to work client 340 with a lock rejection based on lock 252B (block 784). Work client 140 receives the rejection (block 786). After work client 340 is rejected, work client 142 completes processing of task 272B and records results (block 788). Work client 142 sends a lock release for lock 252B (e.g., release 372B) (block 790). Work server 152 releases lock 252B (block 792). Work server 152 determines that work client 340 has the highest unexpired priority value 342A (block 794). Work server 152 grants a lock in favor of work client 340 and sends task 372 to work client 340 (block 796). Work client 340 receives task 372 and begins processing task 372 (block 798).

FIG. 8 is a block diagram of a dynamic distributed work allocation system according to an example of the present disclosure. Example system 800 includes work server 850 storing tasks 870A-B and work server 852 storing tasks 872A-B. Work client 840 is configured to execute on processor 812. Work client 840 sends lock request 820A with priority value 830 to work server 850 and lock request 822A with priority value 832 to work server 852. Work client 840 receives lock notice 880 and task 870A from work server 850. Work client 840 receives lock notice 882 and task 872A from work server 852. Prior to lock duration 860 expiring and prior to completing processing of task 870A, work client 840 sends lock request 820B to work server 850 extending lock duration 860. After processing of task 872A is complete, work client 840 sends lock release notice 862 to work server 852. After sending lock release notice 862, work client 840 sends lock request 822B to work server 852.

Figure 9:
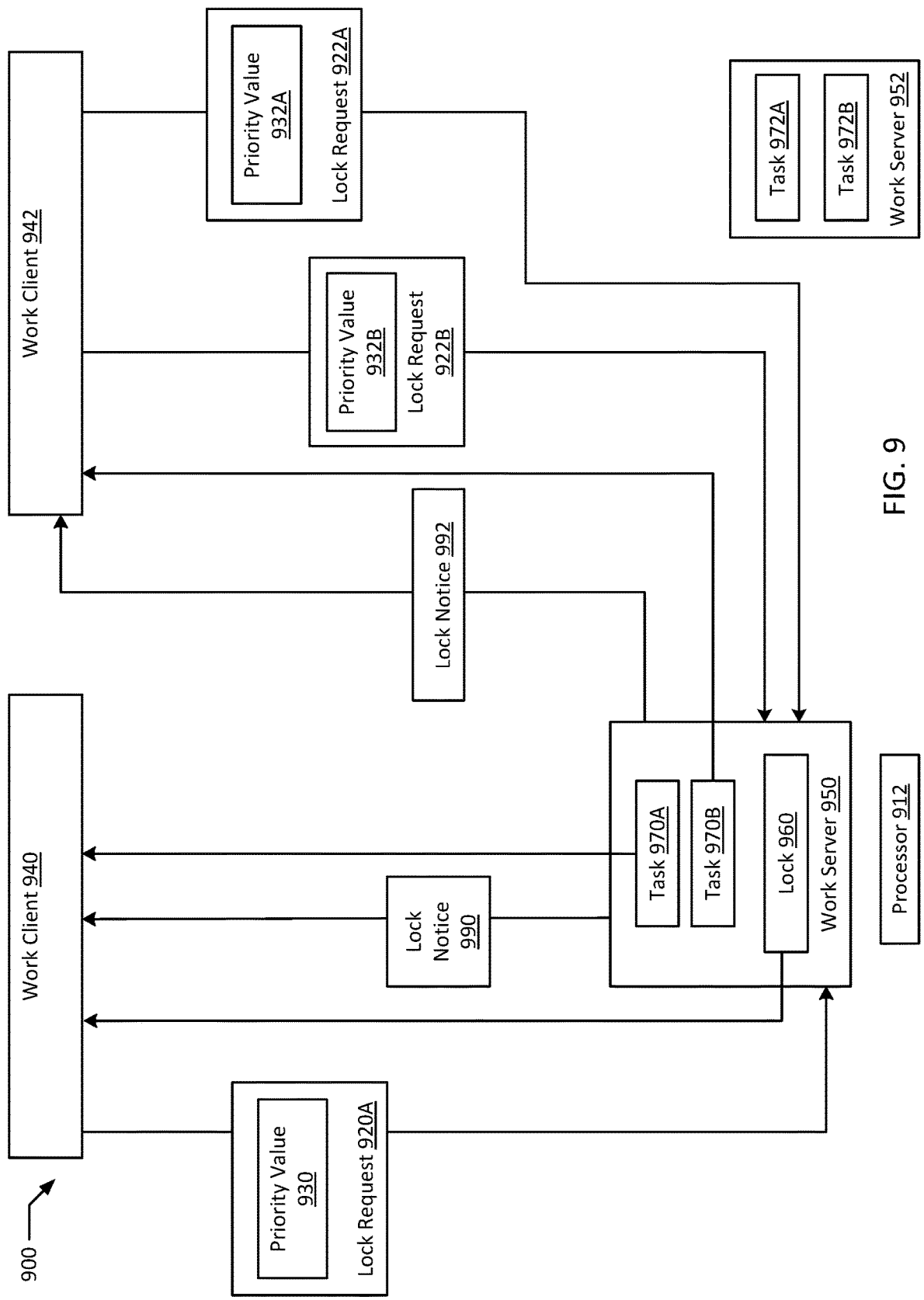
FIG. 9 is a block diagram of a dynamic distributed work allocation system according to an example of the present disclosure.

FIG. 9 is a block diagram of a dynamic distributed work allocation system according to an example of the present disclosure. Example system 900 includes work server 950 storing tasks 970A-B and work server 952 storing tasks 972A-B and work clients 940 and 942. Work server 950 is configured to execute on processor 912 to receive lock request 920A with priority value 930 from work client 940, and lock request 922A with priority value 932A from work client 942. Work server 950 sends lock notice 990 to work client 940 based on comparing priority value 930 and priority value 932A. Lock 960 is assigned to work client 940. Task 970A is sent to work client 940. Work server 950 receives lock request 922B with priority value 932B from work client 942. Work server 950 releases lock 960. Work server 950 sends lock notice 992 and task 970B to work client 942 based on priority value 932B.

Distributed work allocation allows for scalable, efficient, low impact redistribution of parallel processing tasks as processing nodes (e.g., work clients) are brought online or offline. This enables distributed processing tasks to be handled more efficiently, while also protecting distributed processing tasks from the failure of any given processing node by allowing dynamic redistribution of the failed processing node's processing tasks. In the event of failure, due to work aggregators (e.g., work servers) maintaining their own individualized priority lists of processing nodes, probability wise, a failed processing node's tasks will be relatively evenly redistributed to other processing nodes still actively processing. In addition, by dividing queued up processing tasks into bounded units of work, dynamic redistribution of work is achieved by creating stopping points where work aggregators may reevaluate where to send subsequent processing tasks. This allows processing nodes instantiated while a previous processing task was being executed to have a chance to receive a subsequent share of work. In addition, distributed work allocation as disclosed herein does not incur additional monitoring overhead, or create any centralized points of failure in terms of implementing a work allocation monitor. Processing nodes announce their own presence and request work while online, and work servers automatically detect processing nodes that experience failures or go offline based on the processing nodes no longer requesting work. Parallel processing tasks are more efficiently distributed with minimal if any additional overhead by implementing one message (e.g., a lock request message) that may be interpreted as a prioritized request for work, a request for more time to process existing tasks, and a heartbeat health check. These lock request messages therefore efficiently combine several types of routinely sent messages into one small message with minimal contents resulting in reduced networking bandwidth usage as well. Distributed work allocation systems therefore improve processing efficiency, throughput, and overall computing capacity utilization by removing unintended processing bottlenecks in systems where multiple processing nodes are instantiated to process data in parallel.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a plurality of work servers (WS) each storing a respective plurality of tasks including a first WS storing a first plurality of tasks and a second WS storing a second plurality of tasks; a processor on which a first work client (WC) is configured to: send a first plurality of lock requests to the plurality of WS, including a first lock request with a first priority value (PV) to the first WS and a second lock request with a second PV to the second WS; receive, from the first WS, a first lock notice (LN) and a first task; receive, from the second WS, a second LN and a second task; send, prior to a first lock duration (LD) expiring and prior to completing processing of the first task, a third lock request to the first WS, wherein the first LD is extended based on the third lock request; send, after processing of the second task is complete, a first lock release notice to the second WS; and after sending the first lock release notice, send a fourth lock request to the second WS.

In accordance with a 2nd exemplary aspect of the present disclosure, which may be used in combination with any one or more of other aspects described herein (e.g., the 1st aspect), wherein the second WS receives a fifth lock request from a second WC prior to receiving the fourth lock request from the first WC, and the fifth lock request includes a third PV that is a higher priority than the second PV. In accordance with a 3rd exemplary aspect of the present disclosure, which may be used in combination with any one or more of other aspects described herein (e.g., the 2nd aspect), wherein the second WS is configured to: responsive to receiving the first lock release notice, request confirmation of the third PV; and send a third task to the second WC after receiving an updated lock request from the second WC. In accordance with a 4th exemplary aspect of the present disclosure, which may be used in combination with any one or more of other aspects described herein (e.g., the 2nd aspect), wherein the second WS is configured to: responsive to receiving the first lock release notice, compare a fourth PV associated with the fourth lock request with the third PV; and send a third task to the first WC based on the fourth PV that is a higher priority than the third PV.

In accordance with a 5th exemplary aspect of the present disclosure, which may be used in combination with any one or more of other aspects described herein (e.g., the 1st aspect), wherein the first PV and the second PV are selected from a first PV pool that is populated based on a quantity of the plurality of WS. In accordance with a 6th exemplary aspect of the present disclosure, which may be used in combination with any one or more of other aspects described herein (e.g., the 5th aspect), wherein the first PV pool associated with the first WC is adjusted by a first priority factor based on a first processing capacity of the first WC, a second PV pool associated with a second WC is adjusted by a second priority factor based on a second processing capacity of the second WC, and a lowest priority PV of the first PV pool indicates a higher priority than a lowest priority PV of the second PV pool based on a difference between the first priority factor and the second priority factor.

In accordance with a 7th exemplary aspect of the present disclosure, which may be used in combination with any one or more of other aspects described herein (e.g., the 1st aspect), wherein the first WC is further configured to: retrieve connection information for each of the plurality of WSes from an index. In accordance with an 8th exemplary aspect of the present disclosure, which may be used in combination with any one or more of other aspects described herein (e.g., the 1st aspect), wherein new tasks are continuously added to each plurality of tasks. In accordance with a 9th exemplary aspect of the present disclosure, which may be used in combination with any one or more of other aspects described herein (e.g., the 1st aspect), wherein each task of the first plurality of tasks is a bounded unit of processing work, and the first WS notifies the first WC of the bounded unit of the first task in at least one of the first LN and metadata associated with the first task. In accordance with a 10th exemplary aspect of the present disclosure, which may be used in combination with any one or more of other aspects described herein (e.g., the 9th aspect), wherein the bounded unit is one of a time bounded unit, data size bounded unit, and a quantity bounded unit. In accordance with an 11th exemplary aspect of the present disclosure, which may be used in combination with any one or more of other aspects described herein (e.g., the 9th aspect), wherein a size of the bounded unit is adjusted based on a quantity of WCs actively sending lock requests to the first WS.

In accordance with a 12th exemplary aspect of the present disclosure, which may be used in combination with any one or more of other aspects described herein (e.g., the 1st aspect), wherein the third lock request includes a third PV that is lower priority than the first PV. In accordance with a 13th exemplary aspect of the present disclosure, which may be used in combination with any one or more of other aspects described herein (e.g., the 1st aspect), wherein prior to receiving the third lock request, the first WS receives a fifth lock request from a second WC with a third PV that is higher priority than the first PV. In accordance with a 14th exemplary aspect of the present disclosure, which may be used in combination with any one or more of other aspects described herein (e.g., the 1st aspect), wherein the first LD is one of dictated by the first WC to the first WS, and dictated by the first WS to the first WC.

In accordance with a 15th exemplary aspect of the present disclosure, which may be used in combination with any one or more of other aspects described herein (e.g., the 1st aspect), wherein the third lock request is sent based on a lock request interval of the first WC expiring. In accordance with a 16th exemplary aspect of the present disclosure, which may be used in combination with any one or more of other aspects described herein (e.g., the 15th aspect), wherein the duration of the lock request interval is configured to vary by being periodically updated, and the duration is shorter than a shortest recommended LD received by the first WC from any WS.

In accordance with a 17th exemplary aspect of the present disclosure, which may be used in combination with any one or more of other aspects described herein (e.g., the 1st aspect), wherein the extended first LD expires, and the first task is reassigned to a second WC. In accordance with an 18th exemplary aspect of the present disclosure, which may be used in combination with any one or more of other aspects described herein (e.g., the 1st aspect), wherein each lock request is associated with a respective validity timeout. In accordance with a 19th exemplary aspect of the present disclosure, which may be used in combination with any one or more of other aspects described herein (e.g., the 1st aspect), wherein the first WC retrieves additional data related to the first task from the first WS after processing an initial data set sent to the first WC by the first WS.

Aspects of the subject matter described herein may be useful alone or in combination with one or more other aspects described herein. In a 20th exemplary aspect of the present disclosure, a system comprises a means for sending, by a first work client (WC), a first plurality of lock requests to a plurality of work servers (WS) that store a respective plurality of tasks, including a first lock request with a first priority value (PV) to a first WS of the plurality of WS and a second lock request with a second PV to a second WS of the plurality of WS; a means for receiving, from the first WS, a first lock notice (LN) and a first task; a means for receiving, from the second WS, a second LN and a second task; a means for sending, prior to a first lock duration (LD) expiring and prior to completing processing of the first task, a third lock request to the first WS, wherein the first LD is extended based on the third lock request; a means for sending, after processing of the second task is complete, a first lock release notice to the second WS; and a means for after sending the first lock release notice, sending a fourth lock request to the second WS.

Aspects of the subject matter described herein may be useful alone or in combination with one or more other aspects described herein. In a 21st exemplary aspect of the present disclosure, a computer-readable non-transitory storage medium storing executable instructions, which when executed by a computer system, cause the computer system to: send, by a first work client (WC), a first plurality of lock requests to a plurality of work servers (WS) that store a respective plurality of tasks, including a first lock request with a first priority value (PV) to a first WS of the plurality of WS and a second lock request with a second PV to a second WS of the plurality of WS; receive, from the first WS, a first lock notice (LN) and a first task; receive, from the second WS, a second LN and a second task; send, prior to a first lock duration (LD) expiring and prior to completing processing of the first task, a third lock request to the first WS, wherein the first LD is extended based on the third lock request; send, after processing of the second task is complete, a first lock release notice to the second WS; and after sending the first lock release notice, send a fourth lock request to the second WS.

Aspects of the subject matter described herein may be useful alone or in combination with one or more other aspects described herein. In a 22nd exemplary aspect of the present disclosure, a method comprises sending, by a first work client (WC), a first plurality of lock requests to a plurality of work servers (WS) that store a respective plurality of tasks, including a first lock request with a first priority value (PV) to a first WS of the plurality of WS and a second lock request with a second PV to a second WS of the plurality of WS; receiving, from the first WS, a first lock notice (LN) and a first task; receiving, from the second WS, a second LN and a second task; sending, prior to a first lock duration (LD) expiring and prior to completing processing of the first task, a third lock request to the first WS, wherein the first LD is extended based on the third lock request; sending, after processing of the second task is complete, a first lock release notice to the second WS; and after sending the first lock release notice, sending a fourth lock request to the second WS.

In accordance with a 23rd exemplary aspect of the present disclosure, which may be used in combination with any one or more of other aspects described herein (e.g., the 20th, 21st, or 22nd aspects), further comprises: receiving, by the second WS, a fifth lock request from a second WC prior to receiving the fourth lock request from the first WC, wherein the fifth lock request includes a third PV that is a higher priority than the second PV. In accordance with a 24th exemplary aspect of the present disclosure, which may be used in combination with any one or more of other aspects described herein (e.g., the 23rd aspect), further comprises: responsive to receiving the first lock release notice, requesting confirmation of the third PV; and sending a third task to the second WC after receiving an updated lock request from the second WC. In accordance with a 25th exemplary aspect of the present disclosure, which may be used in combination with any one or more of other aspects described herein (e.g., the 23rd aspect), further comprises: responsive to receiving the first lock release notice, comparing a fourth PV associated with the fourth lock request with the third PV; and sending a third task to the first WC based on the fourth PV that is a higher priority than the third PV.

In accordance with a 26th exemplary aspect of the present disclosure, which may be used in combination with any one or more of other aspects described herein (e.g., the 20th, 21st, or 22nd aspects), further comprises: selecting the first PV and the second PV from a first PV pool that is populated based on a quantity of the plurality of WS. In accordance with a 27th exemplary aspect of the present disclosure, which may be used in combination with any one or more of other aspects described herein (e.g., the 26th aspect), further comprises: adjusting the first PV pool associated with the first WC by a first priority factor based on a first processing capacity of the first WC; and adjusting a second PV pool associated with a second WC by a second priority factor based on a second processing capacity of the second WC, wherein a lowest priority PV of the first PV pool indicates a higher priority than a lowest priority PV of the second PV pool based on a difference between the first priority factor and the second priority factor.

In accordance with a 28th exemplary aspect of the present disclosure, which may be used in combination with any one or more of other aspects described herein (e.g., the 20th, 21st, or 22nd aspects), further comprises: retrieving connection information for each of the plurality of WSes from an index. In accordance with a 29th exemplary aspect of the present disclosure, which may be used in combination with any one or more of other aspects described herein (e.g., the 20th, 21st, or 22nd aspects), further comprises: continuously adding new tasks to each plurality of tasks.

In accordance with a 30th exemplary aspect of the present disclosure, which may be used in combination with any one or more of other aspects described herein (e.g., the 20th, 21st, or 22nd aspects), wherein each task of the first plurality of tasks is a bounded unit of processing work, further comprises: notifying, by the first WS, the first WC of the bounded unit of the first task in at least one of the first LN and metadata associated with the first task. In accordance with a 31st exemplary aspect of the present disclosure, which may be used in combination with any one or more of other aspects described herein (e.g., the 30th aspect), wherein the bounded unit is one of a time bounded unit, data size bounded unit, and a quantity bounded unit. In accordance with a 32nd exemplary aspect of the present disclosure, which may be used in combination with any one or more of other aspects described herein (e.g., the 30th aspect), further comprises: adjusting a size of the bounded unit based on a quantity of WCs actively sending lock requests to the first WS.

In accordance with a 33rd exemplary aspect of the present disclosure, which may be used in combination with any one or more of other aspects described herein (e.g., the 20th, 21st, or 22nd aspects), wherein the third lock request includes a third PV that is lower priority than the first PV. In accordance with a 34th exemplary aspect of the present disclosure, which may be used in combination with any one or more of other aspects described herein (e.g., the 20th, 21st, or 22nd aspects), further comprises: receiving a fifth lock request from a second WC with a third PV that is higher priority than the first PV prior to receiving the third lock request. In accordance with a 35th exemplary aspect of the present disclosure, which may be used in combination with any one or more of other aspects described herein (e.g., the 20th, 21st, or 22nd aspects), wherein the first LD is one of dictated by the first WC to the first WS, and dictated by the first WS to the first WC. In accordance with a 36th exemplary aspect of the present disclosure, which may be used in combination with any one or more of other aspects described herein (e.g., the 20th, 21st, or 22nd aspects), further comprises: sending the third lock request based on a lock request interval of the first WC expiring. In accordance with a 37th exemplary aspect of the present disclosure, which may be used in combination with any one or more of other aspects described herein (e.g., the 20th, 21st, or 22nd aspects), further comprises: periodically varying a duration of the lock request interval, wherein the duration is shorter than a shortest recommended LD received by the first WC from any WS. In accordance with a 38th exemplary aspect of the present disclosure, which may be used in combination with any one or more of other aspects described herein (e.g., the 20th, 21st, or 22nd aspects), further comprises: reassigning the first task to a second WC after the extended first LD expires. In accordance with a 39th exemplary aspect of the present disclosure, which may be used in combination with any one or more of other aspects described herein (e.g., the 20th, 21st, or 22nd aspects), wherein each lock request is associated with a respective validity timeout. In accordance with a 40th exemplary aspect of the present disclosure, which may be used in combination with any one or more of other aspects described herein (e.g., the 20th, 21st, or 22nd aspects), further comprises: retrieving, by the first WC, additional data related to the first task from the first WS after processing an initial data set sent to the first WC by the first WS.

Aspects of the subject matter described herein may be useful alone or in combination with one or more other aspects described herein. In a 41st exemplary aspect of the present disclosure, a system comprises a plurality of work servers (WS) each storing a respective plurality of tasks; a plurality of work clients (WC) including a first WC and a second WC; a processor on which a WS of the plurality of WSes is configured to: receive a first lock request from the first WC with a first priority value (PV) and a second lock request from the second WC with a second PV; send a first lock notice (LN) to the first WC based on comparing the first PV and the second PV; assign a first lock to the first WC; send a first task to the first WC; receive a third lock request from the second WC with a third PV; release the first lock; and send a second LN and a second task to the second WC based on the third PV.

In accordance with a 42nd exemplary aspect of the present disclosure, which may be used in combination with any one or more of other aspects described herein (e.g., the 41st aspect), wherein prior to a first lock duration (LD) expiring and prior to the first WC completing processing of the first task, the WS receives a fourth lock request from the first WC, and the WS is further configured to: grant the first WC a LD extension. In accordance with a 43rd exemplary aspect of the present disclosure, which may be used in combination with any one or more of other aspects described herein (e.g., the 42nd aspect), wherein a fourth PV associated with the fourth lock request is a lower priority than one of the second PV and the third PV. In accordance with a 44th exemplary aspect of the present disclosure, which may be used in combination with any one or more of other aspects described herein (e.g., the 42nd aspect), wherein the fourth lock request is sent based on a lock request interval of the first WC expiring, and the lock request interval is configured to vary based on being periodically updated. In accordance with a 45th exemplary aspect of the present disclosure, which may be used in combination with any one or more of other aspects described herein (e.g., the 44th aspect), wherein the WS is configured to send a recommended LD to the first WC, and a duration of the lock request interval is configured to be shorter than the shortest recommended LD received by the first WC from any WS. In accordance with a 46th exemplary aspect of the present disclosure, which may be used in combination with any one or more of other aspects described herein (e.g., the 42nd aspect), wherein the extended first LD expires, and the first task is reassigned to the second WC.

In accordance with a 47th exemplary aspect of the present disclosure, which may be used in combination with any one or more of other aspects described herein (e.g., the 41st aspect), wherein after the first WC completes processing of the first task, the WS is configured to: receive a lock release notice from the first WC; and after receiving the lock release notice, receive a fourth lock request from the first WC. In accordance with a 48th exemplary aspect of the present disclosure, which may be used in combination with any one or more of other aspects described herein (e.g., the 41st aspect), wherein the third PV is a higher priority than one of the first PV and a fourth PV updating the first PV received from the first WC. In accordance with a 49th exemplary aspect of the present disclosure, which may be used in combination with any one or more of other aspects described herein (e.g., the 41st aspect), wherein the WS is configured to: responsive to receiving a lock release notice, request confirmation of the third PV prior to sending the second task to the second WC; and send the second task to the second WC after receiving an updated lock request from the second WC. In accordance with a 50th exemplary aspect of the present disclosure, which may be used in combination with any one or more of other aspects described herein (e.g., the 49th aspect), wherein the first PV is adjusted by a first priority factor based on a first processing capacity of the first WC, the second PV is adjusted by a second priority factor based on a second processing capacity of the second WC, and a lowest possible priority PV of the first WC is a higher priority than a lowest possible priority PV of the second WC based on a difference between the first priority factor and the second priority factor.

In accordance with a 51st exemplary aspect of the present disclosure, which may be used in combination with any one or more of other aspects described herein (e.g., the 41st aspect), wherein new tasks are continuously added to each plurality of tasks. In accordance with a 52nd exemplary aspect of the present disclosure, which may be used in combination with any one or more of other aspects described herein (e.g., the 41st aspect), wherein each task of the first plurality of tasks is a bounded unit of processing work, and the WS notifies the first WC of the bounded unit of the first task in at least one of the first LN and metadata associated with the first task. In accordance with a 53rd exemplary aspect of the present disclosure, which may be used in combination with any one or more of other aspects described herein (e.g., the 52nd aspect), wherein the bounded unit is one of a time bounded unit, data size bounded unit, and a count bounded unit. In accordance with a 54th exemplary aspect of the present disclosure, which may be used in combination with any one or more of other aspects described herein (e.g., the 52nd aspect), wherein a size of the bounded unit is reduced for a third task after the WS receives a fourth lock request from a third WC.

In accordance with a 55th exemplary aspect of the present disclosure, which may be used in combination with any one or more of other aspects described herein (e.g., the 41st aspect), wherein each lock request is associated with a respective validity timeout.

Aspects of the subject matter described herein may be useful alone or in combination with one or more other aspects described herein. In a 56th exemplary aspect of the present disclosure, a system comprises a means for receiving, by a work server (WS), a first lock request from a first work client WC with a first priority value (PV) and a second lock request from a second WC with a second PV; a means for sending a first lock notice (LN) to the first WC based on comparing the first PV and the second PV; a means for assigning a first lock to the first WC; a means for sending a first task to the first WC; a means for receiving a third lock request from the second WC with a third PV; a means for releasing the first lock; and a means for sending a second LN and a second task to the second WC based on the third PV.

Aspects of the subject matter described herein may be useful alone or in combination with one or more other aspects described herein. In a 57th exemplary aspect of the present disclosure, a computer-readable non-transitory storage medium storing executable instructions, which when executed by a computer system, cause the computer system to: receive, by a work server (WS), a first lock request from a first work client WC with a first priority value (PV) and a second lock request from a second WC with a second PV; send a first lock notice (LN) to the first WC based on comparing the first PV and the second PV; assign a first lock to the first WC; send a first task to the first WC; receive a third lock request from the second WC with a third PV; release the first lock; and send a second LN and a second task to the second WC based on the third PV.

Aspects of the subject matter described herein may be useful alone or in combination with one or more other aspects described herein. In a 58th exemplary aspect of the present disclosure, a method comprises receiving, by a work server (WS), a first lock request from a first work client WC with a first priority value (PV) and a second lock request from a second WC with a second PV; sending a first lock notice (LN) to the first WC based on comparing the first PV and the second PV; assigning a first lock to the first WC; sending a first task to the first WC; receiving a third lock request from the second WC with a third PV; releasing the first lock; and sending a second LN and a second task to the second WC based on the third PV.

In accordance with a 59th exemplary aspect of the present disclosure, which may be used in combination with any one or more of other aspects described herein (e.g., the 56th, 57th, or 58th aspects), further comprise: receiving, by the WS, a fourth lock request from the first WC prior to a first lock duration (LD) expiring and prior to the first WC completing processing of the first task; and grantiing, by the WS, a LD extension to the first WC. In accordance with a 60th exemplary aspect of the present disclosure, which may be used in combination with any one or more of other aspects described herein (e.g., the 59th aspect), wherein a fourth PV associated with the fourth lock request is a lower priority than one of the second PV and the third PV. In accordance with a 61st exemplary aspect of the present disclosure, which may be used in combination with any one or more of other aspects described herein (e.g., the 59th aspect), further comprises: sending the fourth lock request based on a lock request interval of the first WC expiring; and periodically updating the lock request interval to vary. In accordance with a 62nd exemplary aspect of the present disclosure, which may be used in combination with any one or more of other aspects described herein (e.g., the 61st aspect), further comprises: sending a recommended LD to the first WC; and configuring a duration of the lock request interval to be shorter than the shortest recommended LD received by the first WC from any WS. In accordance with a 63rd exemplary aspect of the present disclosure, which may be used in combination with any one or more of other aspects described herein (e.g., the 59th aspect), further comprises: reassigning the first task to the second WC after the extended first LD expires.

In accordance with a 64th exemplary aspect of the present disclosure, which may be used in combination with any one or more of other aspects described herein (e.g., the 56th, 57th, or 58th aspects), further comprise: receiving a lock release notice from the first WC after the first WC completes processing of the first task; and receiving a fourth lock request from the first WC after receiving the lock release notice. In accordance with a 65th exemplary aspect of the present disclosure, which may be used in combination with any one or more of other aspects described herein (e.g., the 56th, 57th, or 58th aspects), wherein the third PV is a higher priority than one of the first PV and a fourth PV updating the first PV received from the first WC. In accordance with a 66th exemplary aspect of the present disclosure, which may be used in combination with any one or more of other aspects described herein (e.g., the 56th, 57th, or 58th aspects), further comprise: responsive to receiving a lock release notice, requesting confirmation of the third PV prior to sending the second task to the second WC; and sending the second task to the second WC after receiving an updated lock request from the second WC. In accordance with a 67th exemplary aspect of the present disclosure, which may be used in combination with any one or more of other aspects described herein (e.g., the 66th aspect), further comprises: adjusting the first PV pool associated with the first WC by a first priority factor based on a first processing capacity of the first WC; and adjusting a second PV pool associated with a second WC by a second priority factor based on a second processing capacity of the second WC, wherein a lowest priority PV of the first PV pool indicates a higher priority than a lowest priority PV of the second PV pool based on a difference between the first priority factor and the second priority factor.

In accordance with a 68th exemplary aspect of the present disclosure, which may be used in combination with any one or more of other aspects described herein (e.g., the 56th, 57th, or 58th aspects), further comprise: continuously adding new tasks to each plurality of tasks. In accordance with a 69th exemplary aspect of the present disclosure, which may be used in combination with any one or more of other aspects described herein (e.g., the 56th, 57th, or 58th aspects), further comprise: notifying the first WC of a bounded unit of the first task in at least one of the first LN and metadata associated with the first task. In accordance with a 70th exemplary aspect of the present disclosure, which may be used in combination with any one or more of other aspects described herein (e.g., the 69th aspect), wherein the bounded unit is one of a time bounded unit, data size bounded unit, and a count bounded unit. In accordance with a 71st exemplary aspect of the present disclosure, which may be used in combination with any one or more of other aspects described herein (e.g., the 69th aspect), further comprises: reducing a size of the bounded unit for a third task after the WS receives a fourth lock request from a third WC.

In accordance with a 72nd exemplary aspect of the present disclosure, which may be used in combination with any one or more of other aspects described herein (e.g., the 56th, 57th, or 58th aspects), wherein each lock request is associated with a respective validity timeout.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a plurality of work servers (WS) each storing a respective plurality of tasks including a first WS storing a first plurality of tasks and a second WS storing a second plurality of tasks;
    a processor on which a first work client (WC) is configured to:
    send a first plurality of lock requests to the plurality of WS, including a first lock request with a first priority value (PV) to the first WS and a second lock request with a second PV to the second WS;
    receive, from the first WS, a first lock notice (LN) and a first task;
    receive, from the second WS, a second LN and a second task;
    send, prior to a first lock duration (LD) expiring and prior to completing processing of the first task, a third lock request to the first WS, wherein the first LD is extended based on the third lock request;
    send, after processing of the second task is complete, a first lock release notice to the second WS; and
    after sending the first lock release notice, send a fourth lock request to the second WS.

2. The system of claim 1, wherein the second WS receives a fifth lock request from a second WC prior to receiving the fourth lock request from the first WC, and the fifth lock request includes a third PV that is a higher priority than the second PV.

3. The system of claim 2, wherein the second WS is configured to at least one of:
    (i) request confirmation of the third PV after receiving the first lock release notice, and send a third task to the second WC after receiving an updated lock request from the second WC; and
    (ii) compare a fourth PV associated with the fourth lock request with the third PV and send the third task to the first WC based on the fourth PV having a higher priority than the third PV.

4. The system of claim 1, wherein a first PV pool associated with the first WC and populated based on a quantity of the plurality of WS is adjusted by a first priority factor based on a first processing capacity of the first WC, a second PV pool associated with a second WC is adjusted by a second priority factor based on a second processing capacity of the second WC, a lowest priority PV of the first PV pool indicates a higher priority than a lowest priority PV of the second PV pool based on a difference between the first priority factor and the second priority factor, and the first PV and the second PV are selected from the first PV pool.

5. The system of claim 1, wherein the first WC is further configured to:
    retrieve connection information for each of the plurality of WSes from an index.

6. The system of claim 1, wherein new tasks are continuously added to each plurality of tasks.

7. The system of claim 1, wherein each task of the first plurality of tasks is a bounded unit of processing work, the bounded unit is one of a time bounded unit, data size bounded unit, and a quantity bounded unit, a size of the bounded unit is adjusted based on a quantity of WCs actively sending lock requests to the first WS, and the first WS notifies the first WC of the bounded unit of the first task in at least one of the first LN and metadata associated with the first task.

8. The system of claim 1, wherein the third lock request is associated with a third PV, and prior to receiving the third lock request, the first WS receives a fifth lock request from a second WC with a fourth PV that is higher priority than one of the first PV and the third PV.

9. The system of claim 1, wherein the third lock request is sent based on a lock request interval of the first WC expiring, a duration of the lock request interval is periodically updated, and the duration is shorter than a shortest recommended LD received by the first WC from any WS.

10. The system of claim 1, wherein the extended first LD expires, and the first task is reassigned to a second WC.

11. The system of claim 1, wherein each lock request is associated with a respective validity timeout.

12. The system of claim 1, wherein the first WC retrieves additional data related to the first task from the first WS after processing an initial data set sent to the first WC by the first WS.

13. A method comprising:
sending, by a first work client (WC), a first plurality of lock requests to a plurality of work servers (WS) that store a respective plurality of tasks, including a first lock request with a first priority value (PV) to a first WS of the plurality of WS and a second lock request with a second PV to a second WS of the plurality of WS;
receiving, from the first WS, a first lock notice (LN) and a first task;
receiving, from the second WS, a second LN and a second task;
sending, prior to a first lock duration (LD) expiring and prior to completing processing of the first task, a third lock request to the first WS, wherein the first LD is extended based on the third lock request;
sending, after processing of the second task is complete, a first lock release notice to the second WS; and
after sending the first lock release notice, sending a fourth lock request to the second WS.

* * * * *